United States Patent
Kawaguchi

(10) Patent No.: US 9,749,456 B2
(45) Date of Patent: Aug. 29, 2017

(54) ELECTRONIC DEVICE, CONTROL METHOD, AND PROGRAM FOR SUPPRESSING NOTIFICATION OF INCOMING COMMUNICATIONS DURING CONNECTION TO AN EXTERNAL DEVICE

(71) Applicant: KYOCERA Corporation, Kyoto-shi, Kyoto (JP)

(72) Inventor: Kouichi Kawaguchi, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/434,715

(22) PCT Filed: Oct. 8, 2013

(86) PCT No.: PCT/JP2013/077305
§ 371 (c)(1),
(2) Date: Apr. 9, 2015

(87) PCT Pub. No.: WO2014/057923
PCT Pub. Date: Apr. 17, 2014

(65) Prior Publication Data
US 2015/0264168 A1    Sep. 17, 2015

(30) Foreign Application Priority Data

Oct. 9, 2012   (JP) ................................ 2012-224572
Oct. 29, 2012  (JP) ................................ 2012-238174
(Continued)

(51) Int. Cl.
*H04M 1/725*     (2006.01)
*H04W 68/00*     (2009.01)
(Continued)

(52) U.S. Cl.
CPC ......... *H04M 1/72563* (2013.01); *H04M 1/21* (2013.01); *H04M 1/72527* (2013.01);
(Continued)

(58) Field of Classification Search
CPC ......... H04M 1/72563; H04M 1/72527; H04M 1/21; H04M 19/04; H04W 68/00; H04W 52/0267

See application file for complete search history.

(56) References Cited

U.S. PATENT DOCUMENTS 8,639,298 B2 *  1/2014  Nagata .................... H04M 1/21
                                                 348/552
8,700,091 B2    4/2014  Ueda et al.
(Continued)

FOREIGN PATENT DOCUMENTS

EP    2 315 418 A1    4/2011
JP    2004-274104 A   9/2004
(Continued)

OTHER PUBLICATIONS

International Search Report dated Jan. 28, 2014 issued in counterpart International application No. PCT/JP2013/077305.
(Continued)

*Primary Examiner* — Brandon Miller
(74) *Attorney, Agent, or Firm* — Procopio Cory Hargreaves and Savitch LLP

(57) ABSTRACT

The present disclosure is to provide an electronic device, a control method and a program, which execute control so as not to cause wasteful electric power consumption, by suppressing functions under a certain condition, in a state where the electronic device is connected to an external device by using an external interface. The electronic device is provided with: an external interface connected to an external device; a notification unit; and a control unit; when incoming
(Continued)

communication is received in a state where the external interface is connected to the external device, the control unit suppresses notification by the notification unit, transmits a signal indicating receipt of the incoming communication to the external device via the external interface, and controls the external device to perform notification of the incoming communication.

17 Claims, 14 Drawing Sheets

(30) Foreign Application Priority Data

Oct. 29, 2012 (JP) ................................ 2012-238175
Oct. 29, 2012 (JP) ................................ 2012-238176

(51) Int. Cl.
*H04M 1/21* (2006.01)
*H04M 19/04* (2006.01)
*H04W 52/02* (2009.01)

(52) U.S. Cl.
CPC ....... *H04M 19/04* (2013.01); *H04W 52/0267* (2013.01); *H04W 68/00* (2013.01); *Y02B 60/50* (2013.01)

(56) References Cited

U.S. PATENT DOCUMENTS

| | | | | |
|---|---|---|---|---|
| 2006/0019649 | A1* | 1/2006 | Feinleib | H04M 1/7253 455/420 |
| 2008/0139190 | A1* | 6/2008 | Bunte | H04M 1/663 455/418 |
| 2009/0029681 | A1* | 1/2009 | Clemow | G06F 9/4443 455/412.2 |
| 2011/0003587 | A1* | 1/2011 | Belz | H04M 19/04 455/419 |
| 2011/0053564 | A1* | 3/2011 | Imaeda | H04M 1/663 455/412.2 |
| 2011/0098086 | A1 | 4/2011 | Nagata | |
| 2011/0205153 | A1 | 8/2011 | Ueda et al. | |
| 2012/0231849 | A1* | 9/2012 | Yamashita | H04M 1/0245 455/566 |

FOREIGN PATENT DOCUMENTS

| | | |
|---|---|---|
| JP | 2006-262190 A | 9/2006 |
| JP | 2007-142815 A | 6/2007 |
| JP | 2008-109341 A | 5/2008 |
| JP | 2009-303242 A | 12/2009 |
| JP | 2010-81423 A | 4/2010 |
| JP | 2011-35855 A | 2/2011 |
| JP | 2011-091699 A | 5/2011 |
| JP | 2011-176889 A | 9/2011 |
| JP | 2012-114620 A | 6/2012 |

OTHER PUBLICATIONS

Office Action dated Sep. 13, 2016 issued by Japanese Patent Office in corresponding Japanese Patent Application No. 2012-238174.
Extended European Search Report dated May 13, 2016 issued by the European Patent Office for Counterpart European Application No. 13 84 6142.
Office Action dated Oct. 27, 2016 issued by Japanese Patent Office for corresponding Japanese Patent Application No. 2012-238176.
Office Action dated Oct. 24, 2016 issued by Japanese Patent Office for corresponding Japanese Patent Application No. 2012-238175.
Office Action dated Nov. 8, 2016 issued by Japanese Patent Office for corresponding Japanese Patent Application No. 2012-238176.
Office Action dated Nov. 8, 2016 issued by Japanese Patent Office for corresponding Japanese Patent Application No. 2012-238175.
Decision of Refusal dated Apr. 25, 2017 issued in counterpart Japanese Application No. 2012-238174.
Office Action dated May 23, 2017 issued in counterpart Japanese Application No. 2012-238175.

* cited by examiner

FIG. 13
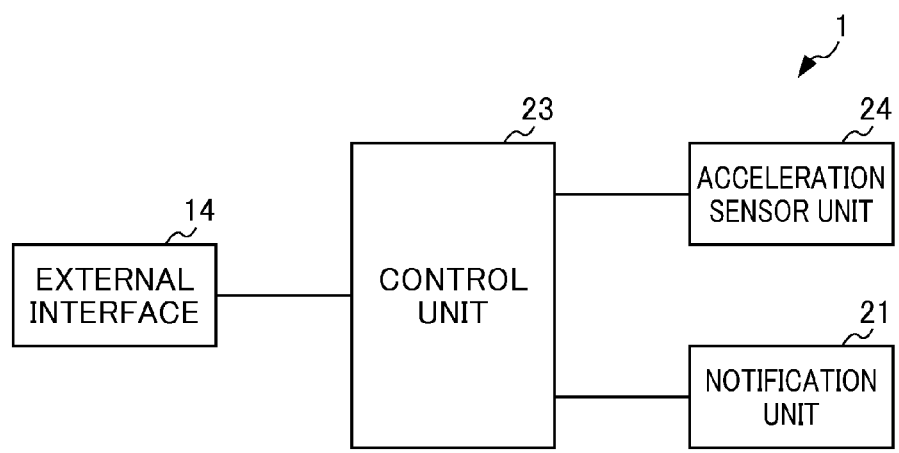
FIG. 14
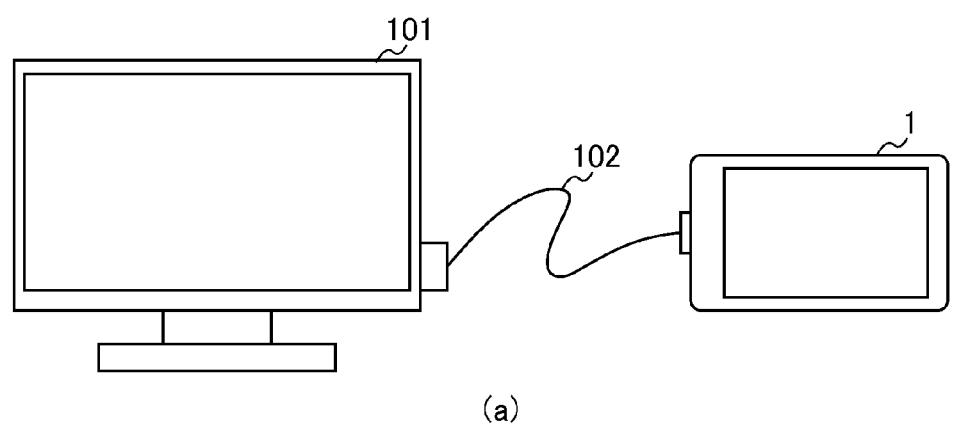
(a)
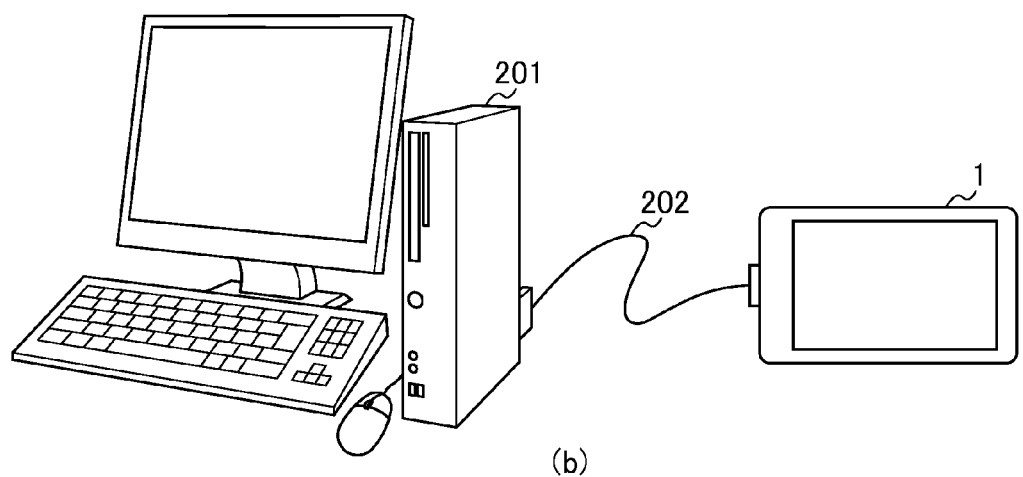
(b)

FIG. 18
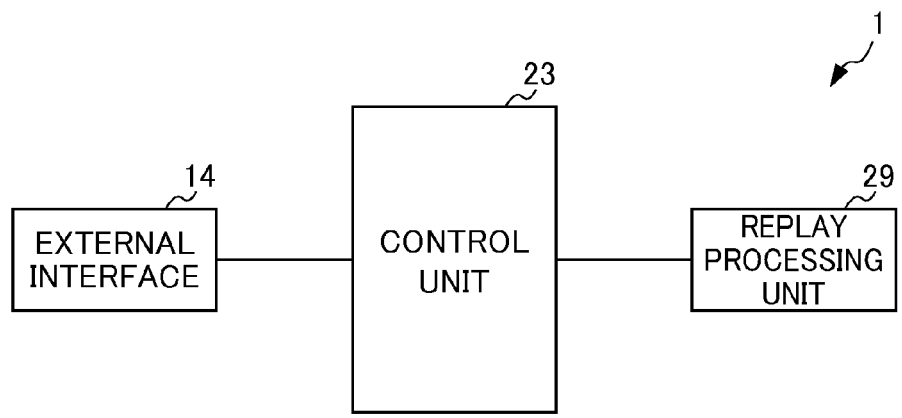
FIG. 19
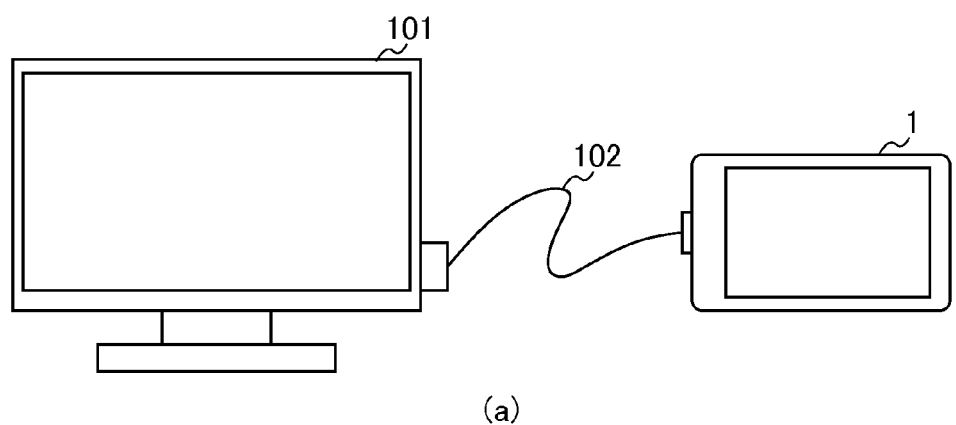
(a)
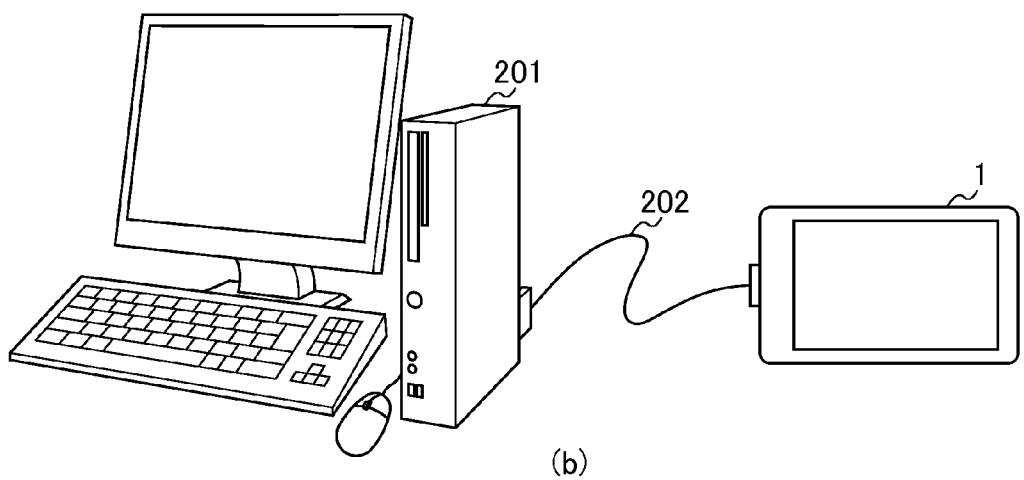
(b)

ELECTRONIC DEVICE, CONTROL METHOD, AND PROGRAM FOR SUPPRESSING NOTIFICATION OF INCOMING COMMUNICATIONS DURING CONNECTION TO AN EXTERNAL DEVICE

FIELD

The present disclosure relates to an electronic device having a connector connected to an external device, and relates to a control method and a program for controlling the electronic device.

BACKGROUND

An HDMI (registered trademark) standard exists as an interface for connecting a portable terminal to a television. When the portable terminal or the like is connected to the television via an interface employing the HDMI standard, for example, contents stored in the portable terminal or the like can be transmitted to the television, and the contents can be displayed on the television (for example, refer to Patent Document 1).

In recent years, an MHL (registered trademark) standard also exists, which is based on the HDMI standard. MHL is an interface standard for high-speed video transmission intended for portable terminals. MHL can transmit video data of uncompressed 1080p horizontal resolution and 30 fps to a television via three terminals. Note that a USB connector having five terminals is actually diverted for this purpose in MHL.

In this manner, as the advantage of employing MHL, a television can be connected by using a USB connector which is a general-purpose connector.

SUMMARY

Incidentally, in a state where a portable terminal is connected to a television via an interface conforming to the MHL standard or the like, for example, when the portable terminal receives incoming communication such as an incoming telephone call, it could be easier for a user to recognize reception of incoming communication, which is performed on the television.

An electronic device according to the present disclosure is configured to include: a connector, which is connected to an external device; a notification unit; and a control unit; when incoming communication is received in a state where the connector is connected to the external device, the control unit suppresses notification by the notification unit, transmits a signal indicating receipt of the incoming communication to the external device via the connector, and controls the external device to perform notification of the incoming communication.

The electronic device may be configured to include an acceleration sensor unit; when incoming communication is received in a state where the connector is connected to the external device, in a case in which the acceleration sensor unit does not output a detection value higher than a predetermined value, the control unit may be configured to suppress notification by the notification unit.

In the electronic device, the notification unit may be a vibrator for performing notification by vibration; and when incoming communication is received in a state where the connector is connected to the external device, in a case in which the acceleration sensor unit does not output a detection value higher than a predetermined value, the control unit may be configured to suppress vibration of the vibrator.

The electronic device may be configured to include a storage unit for storing a plurality of applications; and when incoming communication is received in a state where the connector is connected to the external device, in a case in which a predetermined application is running, the control unit may be configured not to suppress notification by the notification unit.

In the electronic device, when incoming communication is received in a state where the connector is connected to the external device, in a case in which a power source of the external device is turned off, the control unit may be configured not to suppress notification by the notification unit.

A control method according to the present disclosure is configured to include the steps of: suppressing notification by a notification unit, when incoming communication is received in a state where a connector is connected to an external device; and controlling the external device to perform notification of the incoming communication, by transmitting a signal indicating receipt of the incoming communication to the external device via the connector.

The program according to the present disclosure is for causing a computer to execute the steps of: suppressing notification by a notification unit, when incoming communication is received in a state where a connector is connected to an external device; and controlling the external device to perform notification of the incoming communication, by transmitting a signal indicating receipt of the incoming communication to the external device via the connector.

Effects of the Invention

According to the present disclosure, in a state of being connected to an external device by using an external interface, it is possible to execute control so as not to cause wasteful electric power consumption, by suppressing functions under a certain condition.

BRIEF DESCRIPTION OF THE DRAWINGS

FIG. 13 is a block diagram showing a configuration of the smartphone;

FIG. 14 is a diagram showing a state where an external device is connected to the smartphone via a cable;

FIG. 18 is a block diagram showing a configuration of the smartphone;

FIG. 19 is a diagram showing a state where an external device is connected to the smartphone via a cable;

DESCRIPTION OF EMBODIMENT

An embodiment for carrying out the present disclosure is described in detail with reference to the drawings. Hereinafter, a smartphone will be described as an example of an electronic device.

An object of the present disclosure is to provide an electronic device, a control method and a program, which execute control so as not to cause wasteful electric power consumption, by suppressing functions under a certain condition, in a state where the electronic device is connected to an external device by using an external interface.

Figure 1:
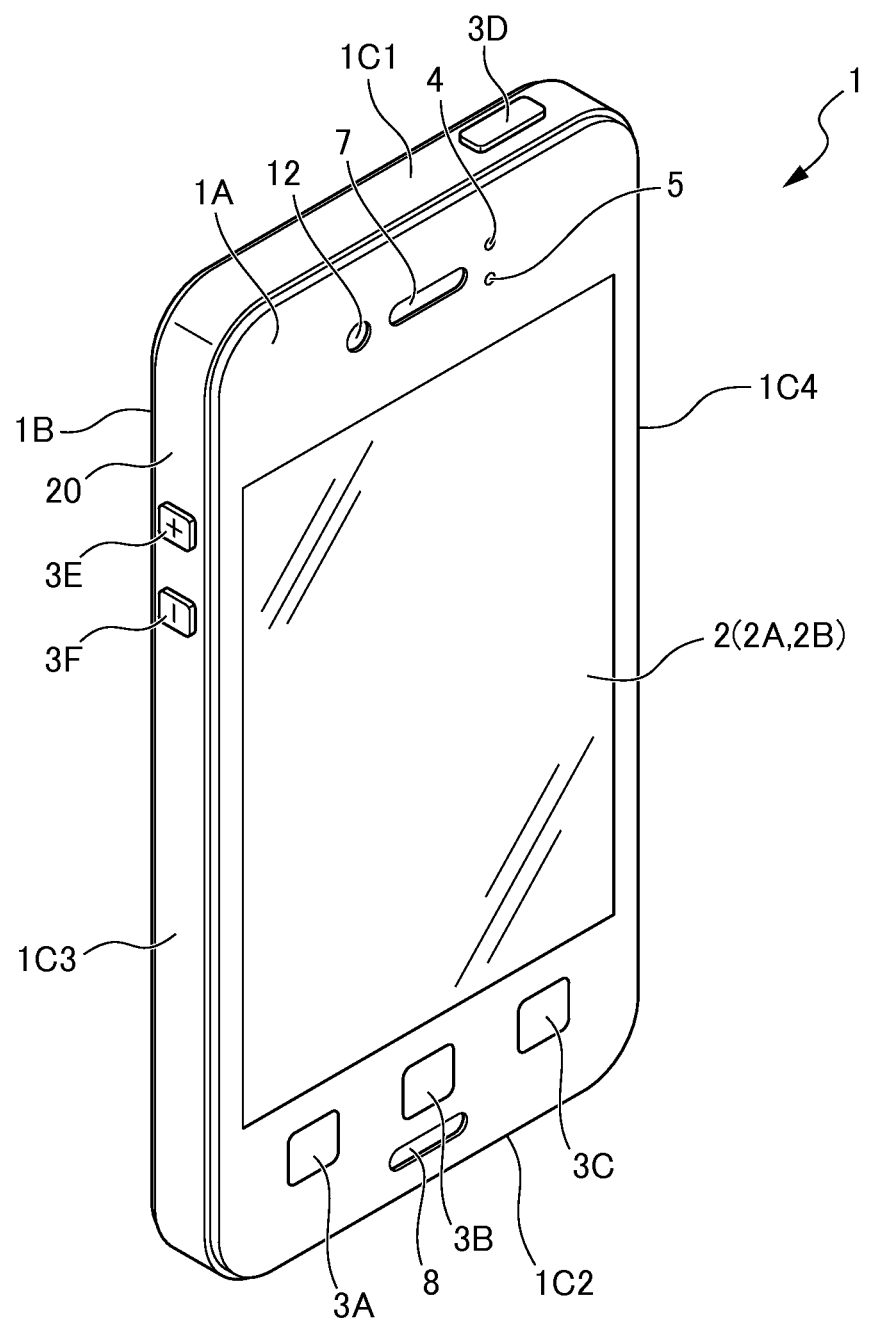
FIG. 1 is a perspective view showing an external appearance of a smartphone according to an embodiment.
Figure 2:
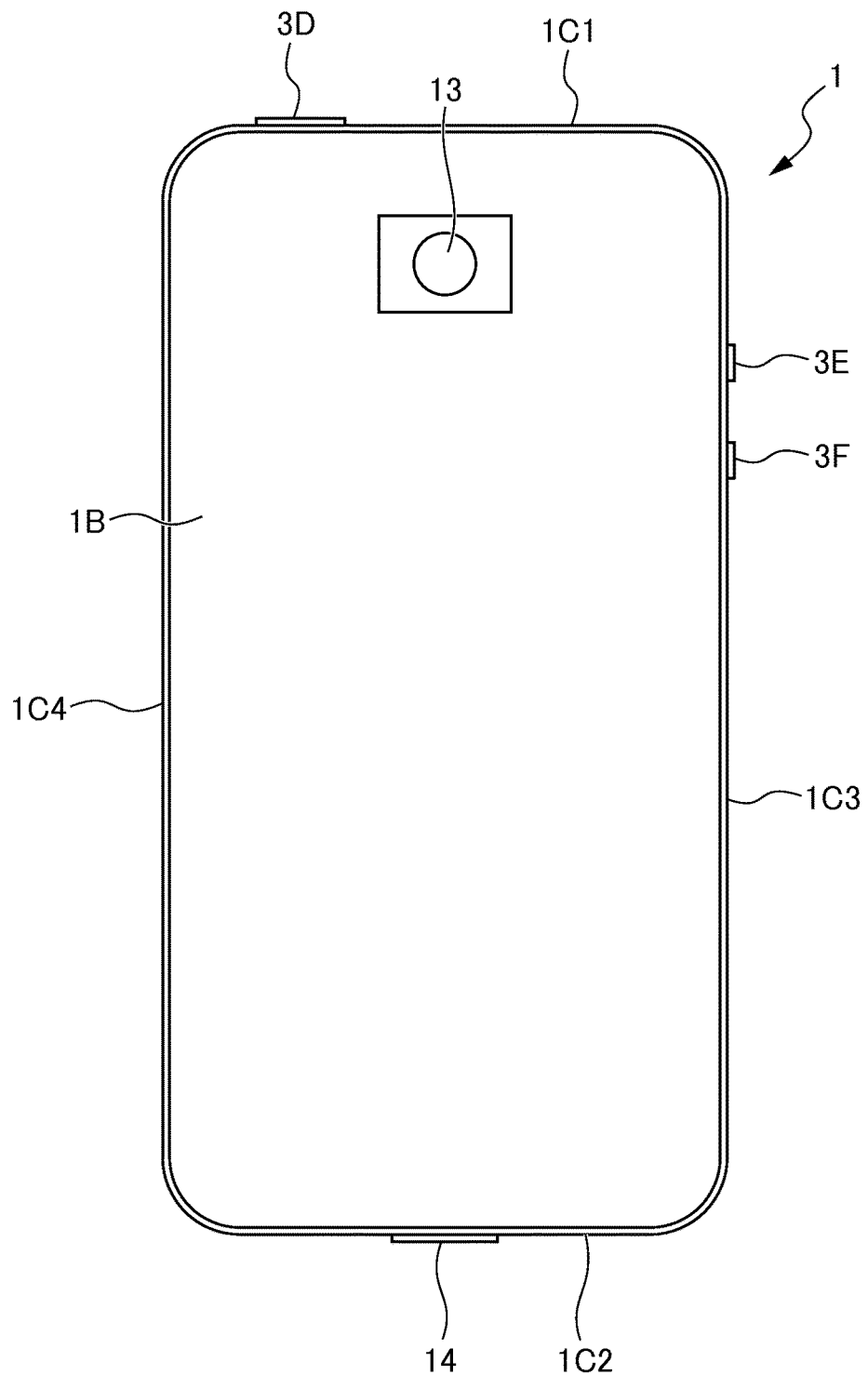
FIG. 2 is rear view showing the external appearance of the smartphone according to some embodiments.

With reference to FIGS. 1 and 2, an external appearance of a smartphone 1 according to some embodiments is described. As shown in FIGS. 1 and 2, the smartphone 1 has a housing 20. The housing 20 has a front face 1A, a back face 1B, and side faces 1C1 to 1C4. The front face 1A is a front face of the housing 20. The back face 1B is a back face of the housing 20. The side faces 1C1 to 1C4 are side faces that connect the front face 1A and the back face 1B. In the following descriptions, the side faces 1C1 to 1C4 may be collectively referred to as a side face 1C without specifying which face.

On the front face 1A, the smartphone 1 has a touch-screen display 2, buttons 3A to 3C, an illuminance sensor 4, a proximity sensor 5, a receiver 7, a microphone 8, and a camera 12. The smartphone 1 has a camera 13 in the back face 1B. The smartphone 1 has buttons 3D to 3F and an external interface 14 in the side face 1C. In the following descriptions, the buttons 3A to 3F may be collectively referred to as a button 3 without specifying which button.

The touch-screen display 2 has a display 2A and a touch screen 2B. The display 2A is configured by a display device such as a liquid crystal display, an organic electro-luminescence panel, or an inorganic electro-luminescence panel. The display 2A displays characters, images, symbols, graphics or the like.

The touch screen 2B detects a touch by a finger, a stylus pen or the like to the touch-screen display 2. The touch screen 2B detects a position where a plurality of fingers, the stylus pen or the like touch the touch-screen display 2.

A detection method for the touch screen 2B may be any method such as a capacitive sensing method, a resistor film method, a surface acoustic wave method (or an ultrasonic sensing method), an infrared ray method, and an electromagnetic induction method. In the following, for the purpose of simplifying descriptions, the fingers, the stylus pen or the like may be simply referred to as a "finger", a touch by which to the touch-screen display 2 is detected by the touch screen 2B.

The smartphone 1 distinguishes a type of a gesture, based on a touch(s), a touched position(s), a touching period of time, or a touching number of times, detected by the touch screen 2B. The gesture is an operation that is performed on the touch-screen display 2. Gestures that are distinguished by the smartphone 1 include a touch, a long touch, a release, a swipe, a tap, a double tap, a long tap, a drag, a flick, a pinch-in, a pinch-out, and the like.

The smartphone 1 is operated in accordance with these gestures that are distinguished via the touch screen 2B. Therefore, intuitive and easy-to-use operability is achieved for a user. An operation, which is performed by the smartphone 1 in accordance with a gesture thus distinguished, is different depending on a screen that is displayed on the touch-screen display 2.

The button 3 is operated by the user. The button 3 has the buttons 3A to 3F. The controller 10 collaborates with the button 3 to detect an operation of the button. The operation of the button is, for example, a click, a double click, a push, and a multi-push.

For example, the buttons 3A to 3C are a home button, a back button or a menu button. For example, the button 3D is a power ON/OFF button of the smartphone 1. The button 3D may also serve as a sleep/wake-up button. For example, the buttons 3E and 3F are volume buttons.

The illuminance sensor 4 detects illuminance. For example, the illuminance is intensity, brightness, brilliance, etc. of light. For example, the illuminance sensor 4 is used for adjusting the brilliance of the display 2A.

The proximity sensor 5 detects presence of a proximate object in a contactless manner. The proximity sensor 5 detects, for example, a face being brought close to the touch-screen display 2.

When a sound signal is transmitted from the controller 10, the receiver 7 outputs the sound signal as sound. The microphone 8 converts sound such as the user's voice into a sound signal, and transmits the sound signal to the controller 10. Note that the smartphone 1 may further have a speaker(s) in addition to the receiver 7. The smartphone 1 may further have a speaker(s) in place of the receiver 7.

The camera 12 is an in-camera that photographs an object from a side of the front face 1A. The camera 13 is an out-camera that photographs an object from a side of the back face 1B.

The external interface (connector) 14 is a terminal, to which another device is connected. The external interface 14 may be a universal terminal such as USB (Universal Serial Bus), HDMI (High-Definition Multimedia Interface), MHL (Mobile High-definition Link), Light Peak (Thunderbolt), and an earpiece-microphone connector. The external interface 14 may be a terminal designed for exclusive use, such as a Dock connector.

The smartphone 1 according to the present embodiment executes control so as not to cause wasteful electric power consumption by suppressing functions under a certain condition, in a state where the smartphone 1 is connected to an external device by using the external interface 14. Descriptions are hereinafter provided for a specific configuration.

First Embodiment

Figure 3:
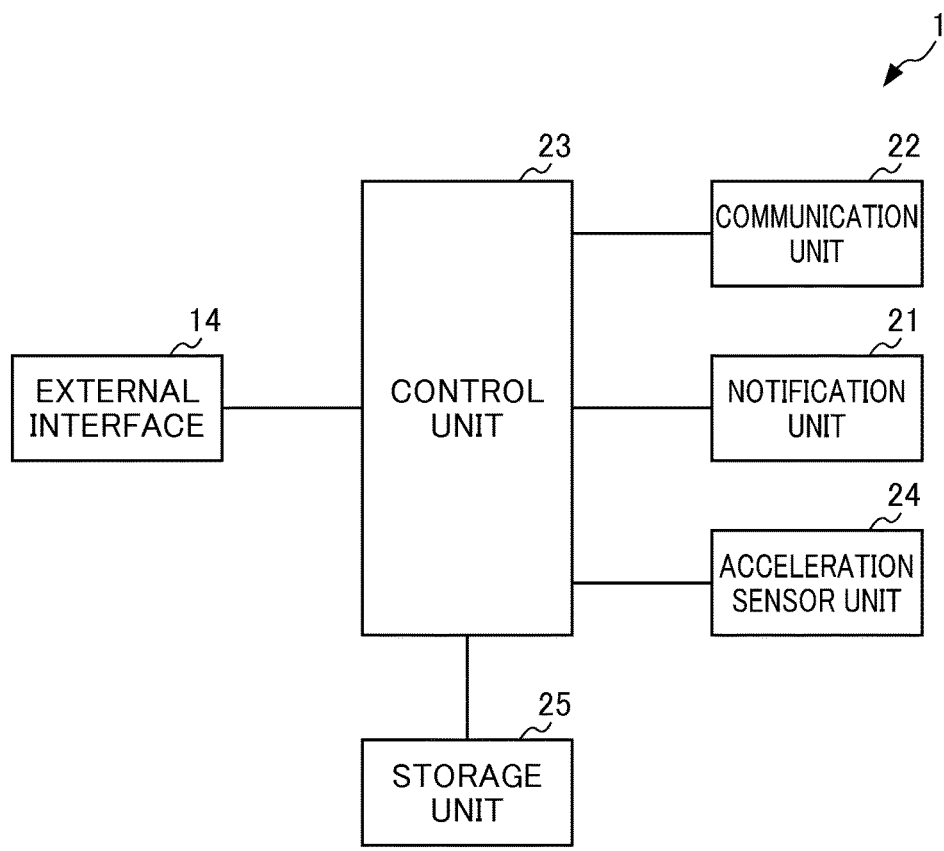
FIG. 3 is a block diagram showing a configuration of the smartphone.

As shown in FIG. 3, the smartphone 1 is provided with the external interface 14, a notification unit 21, a communication unit 22, and a control unit 23. The external interface 14 conforms to a predetermined signal transmission standard (a transmission standard for video signals and sound signals), and is connected to an external device. The predetermined signal transmission standard is, for example, an HDMI standard or an MHL standard.

Figure 4:
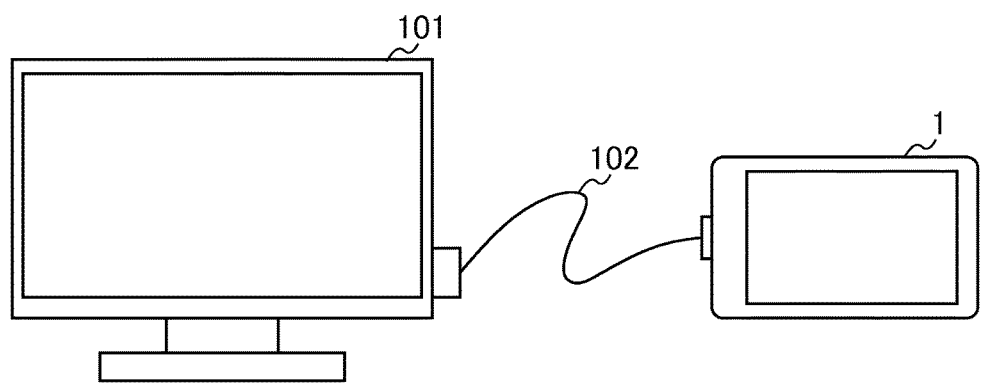
FIG. 4 is a diagram showing a state where an external device is connected to the smartphone via a cable.

As shown in FIG. 4, the present embodiment assumes an aspect, in which a television 101 as an external device and the smartphone 1 are mutually connected via a cable 102. The interface of the television 101 and the external interface 14 of the smartphone 1 are described as conforming to an identical standard, but the present disclosure is not limited thereto.

Figure 5:
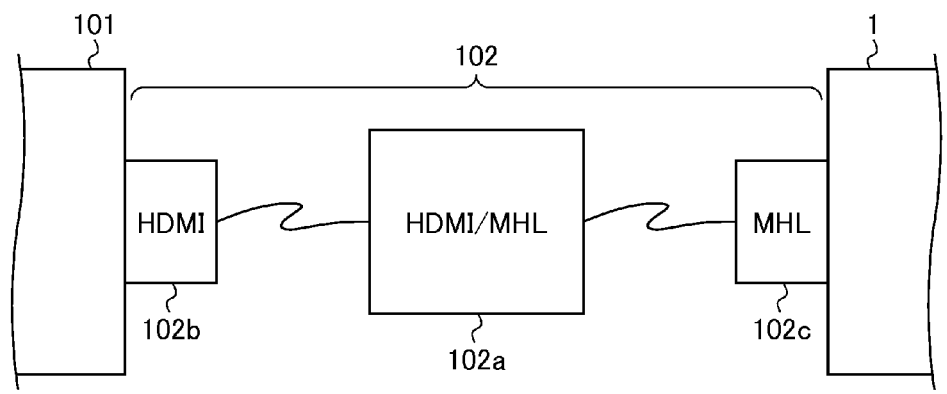
FIG. 5 is a diagram showing a configuration of the cable.

For example, the interface of the television 101 may conform to the HDMI standard, whereas the external interface 14 of the smartphone 1 may conform to the MHL standard. In a case of such a configuration, as shown in FIG. 5, the cable 102 is provided with an adapter 102a for mutually converting HDMI and MHL, in which one terminal 102b is connected to the television 101 by supporting the HDMI standard, and the other terminal 102c is connected to the smartphone 1 by supporting the MHL standard.

The communication unit 22 supports cellular phone communication standards such as 2G, 3G and 4G. The cellular phone communication standards include LTE (Long Term Evolution) (registered trademark), W-CDMA, CDMA2000, PDC, GSM (registered trademark), PHS (Personal Handyphone System) (registered trademark), etc.

In a state where the external interface 14 is connected to an external device, when the communication unit 22 receives incoming communication, the control unit 23 suppresses notification by the notification unit 21, and transmits a signal indicating receipt of incoming communication to the external device via the external interface 14. The external device performs notification in accordance with incoming communication.

The notification unit 21 is a constituent element for externally notifying occurrence of an event such as incoming communication, and is considered to be, for example, a speaker for outputting a ringtone, a vibrator for conducting vibration, a light emitting portion for emitting light, etc.

Suppressing the notification by the notification unit 21, when the notification unit 21 is a speaker, denotes a concept including operations such as muting the sound so as not to be output, and turning down the volume level of the sound to be output.

Figure 6:
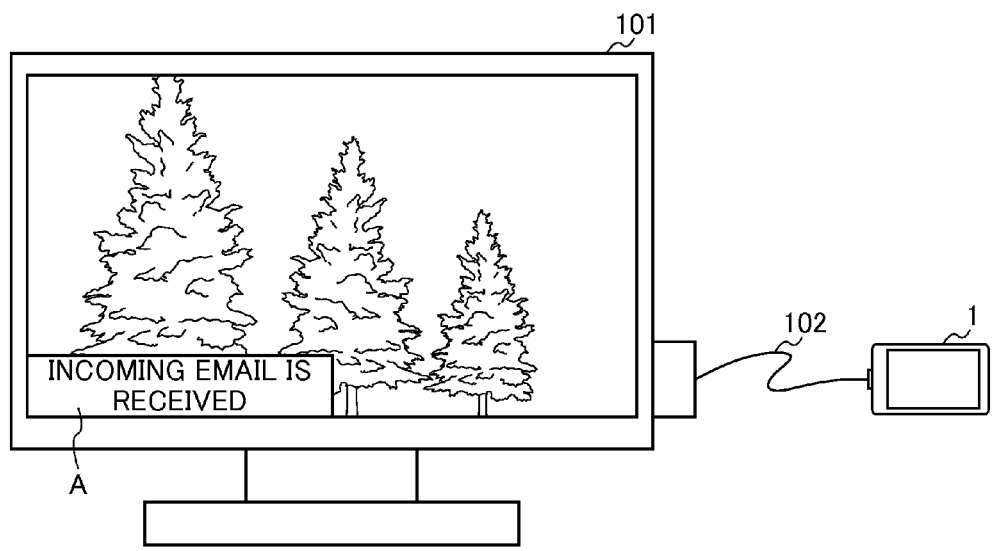
FIG. 6 is a diagram schematically showing a state where information of incoming communication is displayed on a display of the external device.

In a case in which the television 101 receives a signal indicating receipt of incoming communication from the smartphone 1, for example, as shown in FIG. 6, the television 101 displays receipt of the incoming communication (shown as A in FIG. 6) by using an OSD (On Screen Display) function. The control unit 23 may transmit not only presence or absence of incoming communication, but may also transmit information, which includes information relevant to the incoming communication, to the television 101.

For example, when an incoming call is received from a telephone, the control unit 23 transmits a name and a telephone number of the caller to the television 101. When an incoming email message is received, the control unit 23 transmits a sender's name, a subject, presence or absence of an attachment file, flag information indicating importance of the email, etc. to the television 101. The television 101 displays such information by using the OSD function.

Furthermore, the television 101 may be configured to output sound to notify incoming communication from a speaker, in a case in which the television 101 receives a signal indicating receipt of incoming communication from the smartphone 1.

With such a configuration, when incoming communication is received in a state where the smartphone 1 is connected to the television 101 by using the external interface 14, the smartphone 1 suppresses the function of the notification unit 21, and can therefore execute control so as not to cause wasteful electric power consumption. The smartphone 1 outputs notification information to the television 101, and can therefore reliably notify the user watching the television 101 of the incoming communication.

Note that the smartphone 1 may prepare a list of information in advance (telephone number, mail address, etc.) indicating the person to be notified. For example, when the smartphone 1 receives incoming communication by way of the communication unit 22, the smartphone 1 refers to the list, and transmits a signal indicating receipt of incoming communication to the television 101, only for incoming communication from the persons coinciding with the list.

The smartphone 1 may manage duration of continuously notifying incoming communication on the television 101. For example, when the smartphone 1 receives incoming communication by way of the communication unit 22, the smartphone 1 transmits a signal indicating receipt of incoming communication to the television 101, and after a predetermined period of time has elapsed (for example, in ten seconds), the smartphone 1 transmits a signal indicating termination of the notification display to the television 101. At this time, the smartphone 1 may be configured to be switched to an answerphone mode, when an incoming call is received from a telephone by way of the communication unit 22.

The smartphone 1 has been described as receiving incoming communication by way of the communication unit 22, suppressing the notification unit 21, transmitting a signal indicating receipt of the incoming communication to the television 101, and notifying the television 101 of the incoming communication; however, the smartphone 1 may be configured to suppress the notification unit 21, and not to transmit a signal indicating receipt of incoming communication to the television 101, when a user does not respond to the incoming communication, and incoming communication is received again from the identical address or telephone number. In a case of such a configuration, the smartphone 1 leaves a record of having received incoming communication, in the incoming communication history.

In a state where the external interface 14 is connected to an external device, when the communication unit 22 receives incoming communication, in a case in which a predetermined condition is satisfied, the control unit 23 suppresses notification by the notification unit 21, and transmits a signal indicating receipt of incoming communication to the external device via the external interface 14. The external device may perform notification in accordance with incoming communication.

The smartphone 1 may be configured to include an acceleration sensor unit 24, as shown in FIG. 3. In a case of such a configuration, when incoming communication is received in a state where the external interface 14 is connected to an external device, in a case in which the acceleration sensor unit 24 does not output a detection value higher than a predetermined value (including a case in which the acceleration sensor unit 24 does not output a detection value at all), the control unit 23 determines that a predetermined condition is satisfied, and suppresses notification by the notification unit 21.

In this case, when incoming communication is received, the acceleration sensor unit 24 does not output a detection value higher than a predetermined value; and this case is presumed to be a situation where the user does not carry the smartphone 1 in hand when incoming communication is received. In such a situation, it is expected that the user does not notice the incoming communication, even if the smartphone 1 notifies the user of the incoming communication.

Therefore, when incoming communication is received in a state where the smartphone 1 is connected to an external device by using the external interface 14, in a case in which the acceleration sensor unit 24 does not output a detection value higher than a predetermined value, the smartphone 1 executes control so as not to cause wasteful electric power consumption, and outputs notification information to the television 101, and can therefore reliably inform the user watching the television 101 of the incoming communication.

Note that, when incoming communication is received in a state where the smartphone 1 is connected to the television 101 by using the external interface 14, in a case in which the detection value, which is output from the acceleration sensor unit 24 during a predetermined period from receiving the incoming communication, is not higher than a predetermined value, the smartphone 1 may suppress the function of the notification unit 21. In this case, the smartphone 1 does not perform notification by the notification unit 21 for a predetermined period from receiving the incoming communication. On the other hand, when the smartphone 1 receives incoming communication, the smartphone 1 may output notification information to the television 101, before the predetermined period has elapsed.

The notification unit 21 is a vibrator for performing notification by vibration. In a case of such a configuration, when incoming communication is received in a state where the external interface 14 is connected to an external device, in a case in which the acceleration sensor unit 24 does not output a detection value higher than a predetermined value, the control unit 23 determines that a predetermined condition is satisfied, and suppresses the vibration of the vibrator.

Suppressing the vibration of the vibrator denotes a concept including operations such as preventing the vibrator from vibrating, and attenuating the vibration of the vibrator.

Here, in a case in which the smartphone 1 is connected to the television 101 as an external device via the cable 102, there may be a situation where the smartphone 1 is placed on a TV stand, due to the length of the cable 102. In such a situation, when the smartphone 1 receives incoming communication to drive the vibrator, the smartphone 1 may slide from the stand due to the vibration. Furthermore, the cable 102 connecting the smartphone 1 and the television 101 may be disengaged due to the drop impact.

Accordingly, when the external interface 14 is connected to the television 101, the control unit 23 suppresses the vibration of the vibrator. With such a configuration, the smartphone 1 can avoid failure due to drop, and can avoid unexpected disengagement of the cable 102.

Note that, in a case in which the notification unit 21 is a vibrator for performing notification by vibration, when incoming communication is received in a state where the external interface 14 is connected to an external device, the control unit 23 may suppress the vibration of the vibrator.

As shown in FIG. 3, the smartphone 1 is provided with a storage unit 25 for storing a plurality of applications. In a case of such a configuration, when incoming communication is received in a state where the external interface 14 is connected to an external device, if a predetermined application is running, the control unit 23 does not suppress notification by the notification unit 21, by determining that a predetermined condition is not satisfied.

The predetermined application refers to, for example, an application for displaying a video picture on the television 101, displaying an operational UI on the display 2A of the smartphone 1, and moving the video picture displayed on the television 101 by operating the operational UI.

In such a case, since it is estimated that the user is holding the smartphone 1 in hand, it is considered that the smartphone 1 can perform notification of incoming communication to remind the user of the incoming communication.

When incoming communication is received in a state where the external interface 14 is connected to an external device, if the power of the external device is turned off, the control unit 23 may be configured not to suppress notification by the notification unit 21, by determining that a predetermined condition is not satisfied.

More specifically, in a state where the external interface 14 is connected to the television 101 as an external device, when the power of the television 101 is turned off, a signal no longer comes from the television 101, and the control unit 23 finds that the television 101 is in an idle state.

Thus, even if the smartphone 1 is connected to the television 101 via the external interface 14, when the television 101 is in an idle state, the smartphone 1 performs notification of incoming communication as usual; therefore, the smartphone 1 can reliably perform notification of incoming communication.

Figure 7:
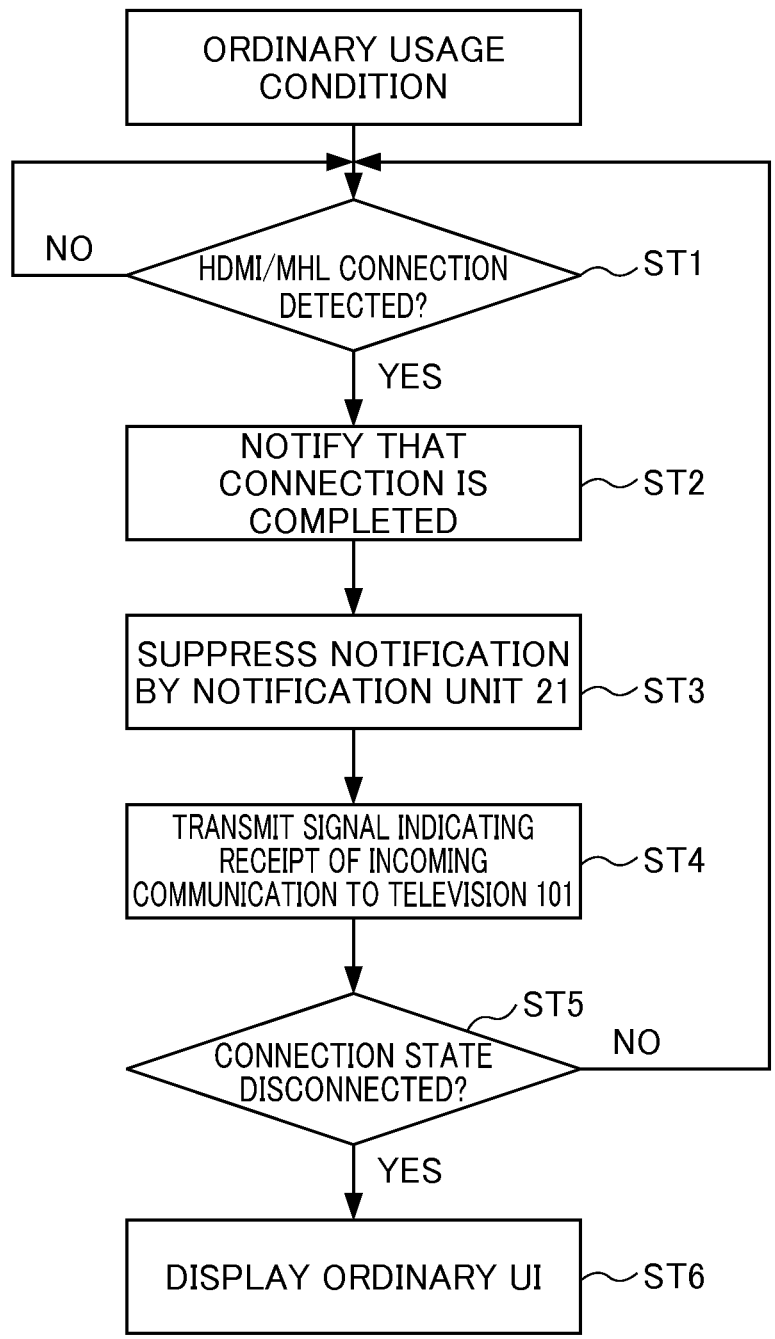
FIG. 7 is a flowchart for illustrating operations of the smartphone.

Next, operations of the smartphone 1 are described with reference to a flowchart shown in FIG. 7. In the following description, the external device is described as the television 101. In Step ST1, the control unit 23 determines whether the television 101 is connected via the external interface 14. More specifically, the control unit 23 determines whether the television 101 is connected via the external interface 14, based on whether HDMI or MHL standard connection is detected. In a case in which the control unit 23 determines that the television 101 is connected (Yes), the processing advances to Step ST2. In a case in which the control unit 23 determines that the television 101 is not connected (No), the processing of Step ST1 is repeated.

In Step ST2, the control unit 23 displays a notice of completing connection on the display 2A. Note that, in the processing of Step ST2, the control unit 23 may also display an UI for exclusive use for HDMI or MHL standard, in addition to the notice of completing connection, on the display 2A.

In Step ST3, the control unit 23 suppresses notification by the notification unit 21. More specifically, the control unit 23 turns off vibration of the vibrator, turns off light emitted from the light emitting portion (for example, an LED), and turns off ringtones to be output from the speaker.

In Step ST4, the control unit 23 transmits a signal indicating receipt of incoming communication to the television 101 via the external interface 14. The television 101 performs notification in accordance with incoming communication.

In Step ST5, the control unit 23 determines whether the connection state with the television 101 is disconnected. In other words, the control unit 23 determines whether the cable 102 is removed from the external interface 14 or the interface of the television 101. In a case in which the control unit 23 determines that the connection state is disconnected (Yes), the processing advances to Step ST6; and in a case in which the control unit 23 determines that the connection state is not disconnected (No), the processing returns to Step ST1.

In Step ST6, the control unit 23 controls the display 2A to display an ordinary UI.

In this manner, when incoming communication is received in a state where the smartphone 1 is connected to the television 101 by using the external interface 14, the smartphone 1 suppresses the function of the notification unit 21, and can therefore execute control so as not to cause wasteful electric power consumption. The smartphone 1 outputs notification information to the television 101, and can therefore reliably notify the user watching the television 101 of the incoming communication.

Note that, in the present embodiment, the external device has been described as the television 101; however, the present disclosure is not limited thereto, as long as notification of incoming communication can be performed. For example, examples of the external device may include a stereo component, a PC, etc.

In the present embodiment, the configurations and operations of the smartphone have been mainly described, but are not limited thereto, and may be configured as a control method and program, which are provided with each constituent element, and execute control so as not to cause wasteful electric power consumption, by suppressing a function under a predetermined condition, in a state of being connected to the external device by using the external interface 14.

Furthermore, an embodiment may be implemented by recording a program for implementing functions of a smartphone in a computer-readable recording medium, and causing a computer system to read and execute the program recorded in the recording medium.

The "computer system" as used herein includes OS and hardware such as peripheral devices. The "computer-readable recording medium" refers to a portable medium such as a flexible disk, a magneto-optical disk, a ROM and a CD-ROM, and a storage device such as a hard disk incorporated into a computer system.

Furthermore, the "computer-readable recording medium" may also include a communication line for dynamically retaining a program over a short period of time, such as a communication line for transmitting a program over a network such as the Internet, or a communication line such as a telephone line; or volatile memory in a computer system serving as a server or client in this case for retaining a program over a certain period of time. The program may be intended to implement a part of the aforementioned functions, or may be able to implement the aforementioned functions in combination with a program that has been already recorded in a computer system.

In the present embodiment, the external interface (connector) 14 has been described as a terminal, to which another device is connected; however, the present disclosure is not limited thereto, and the external interface (connector) may be a wireless interface conforming to a wireless communication standard such as Bluetooth (registered trademark) and WiFi (registered trademark). Therefore, the electronic device of the disclosure of the present application may be communicatively connected to an external device by wireless communication conforming to a wireless communication standard.

Second Embodiment

Figure 8:
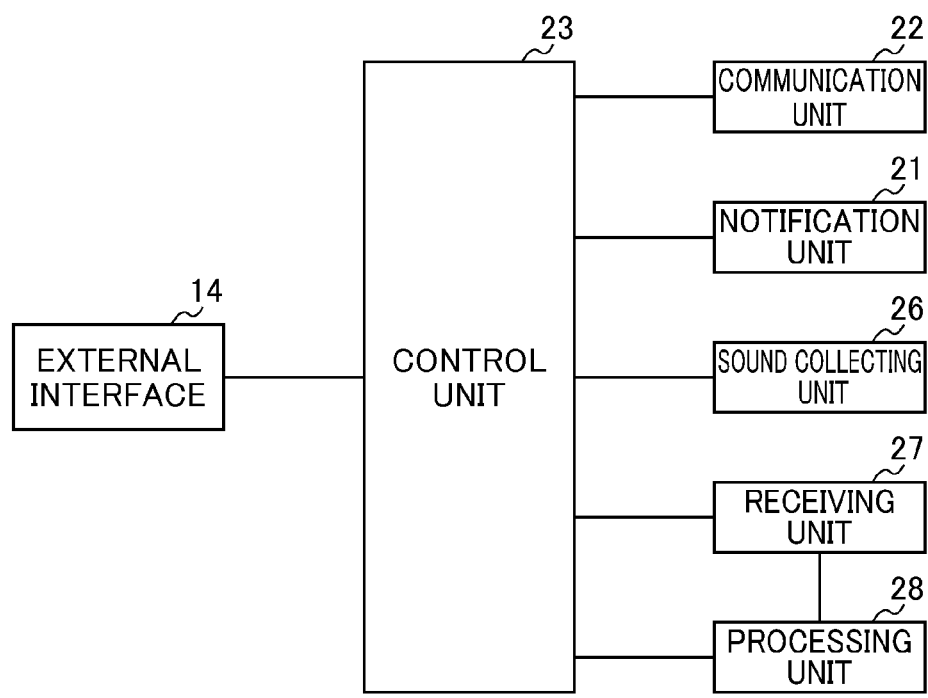
FIG. 8 is a block diagram showing a configuration of the smartphone.
Figure 9:
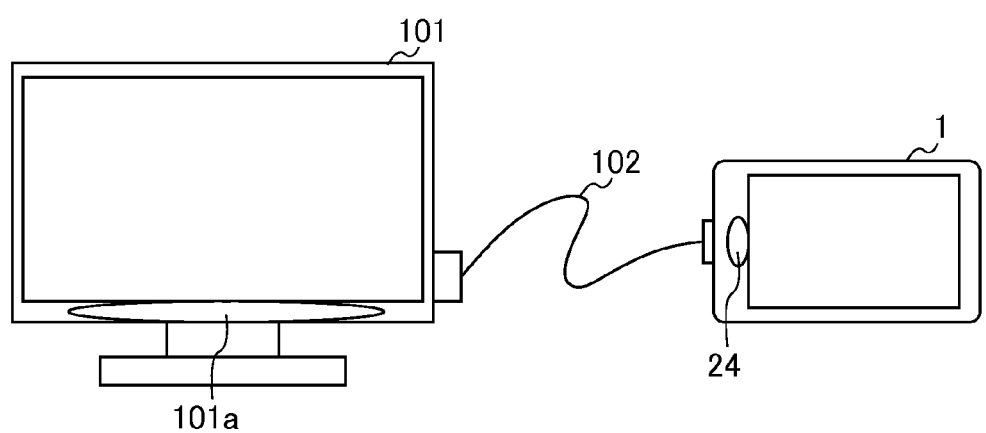
FIG. 9 is a diagram showing a state where the external device is connected to the smartphone via the cable.

As shown in FIG. 8, a smartphone 1 is provided with an external interface 14, a notification unit 21, a communication unit 22, and a control unit 23. The external interface 14 conforms to a predetermined signal transmission standard (for example, a transmission standard for video signals and/or sound signals), and is connected to an external device. The predetermined signal transmission standard is, for example, an HDMI standard or an MHL standard. As shown in FIG. 9, the present embodiment assumes an aspect, in which a television 101 as an external device and the smartphone 1 are mutually connected via a cable 102. The interface of the television 101 and the external interface 14 of the smartphone 1 are described as conforming to an identical standard, but the present disclosure is not limited thereto.

Figure 10:
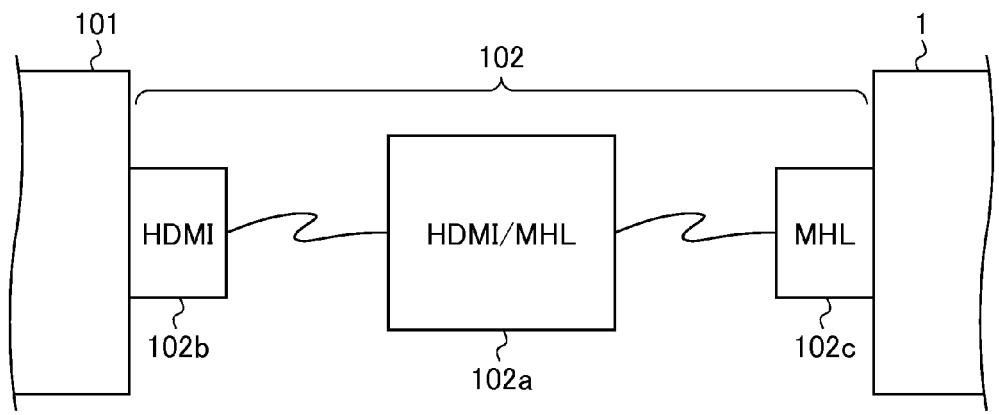
FIG. 10 is a diagram showing a configuration of the cable.

For example, the interface of the television 101 may conform to the HDMI standard, whereas the external interface 14 of the smartphone 1 may conform to the MHL standard. In a case of such a configuration, as shown in FIG. 10, the cable 102 is provided with an adapter 102a for mutually converting HDMI and MHL, in which one terminal 102b is connected to the television 101 by supporting the HDMI standard, and the other terminal 102c is connected to the smartphone 1 by supporting the MHL standard.

The communication unit 22 supports cellular phone communication standards such as 2G, 3G and 4G. The cellular phone communication standards include LTE (Long Term Evolution) (registered trademark), W-CDMA, CDMA2000, PDC, GSM (registered trademark), PHS (Personal Handyphone System) (registered trademark), etc.

The notification unit 21 is a constituent element for externally notifying occurrence of an event such as incoming communication, and is considered to be, for example, a speaker for outputting a ringtone, a vibrator for conducting vibration, a light emitting portion for emitting light, etc.

In a state where the external interface 14 is connected to the television 101, when incoming communication is received by the communication unit 22, the control unit 23 controls the notification unit 21 to perform notification of the incoming communication, by suppressing the volume level of the sound to be output from a sound output unit 101a provided to the television 101. The sound output unit 101a is a speaker. In FIG. 9, the sound output unit 101a is arranged in a lower middle of a front face of the television 101, which is an example, and is not limited to the lower middle of the front face.

Suppressing the volume level of sound denotes a concept including operations such as muting the sound so as not to be output, and turning down the volume level of the sound.

Therefore, when incoming communication is received in a state where the external interface 14 is connected to the television 101, the smartphone 1 suppresses the sound to be output from the sound output unit 101a, and can therefore reliably remind the user of the reception of the incoming communication without failing to hear the notification by the notification unit 21. Even during the phone call after receiving the incoming communication, the smartphone 1 continues suppressing the sound to be output from the sound output unit 101a; therefore, a phone conversation can be made in a satisfactory manner.

Note that, in a state where the external interface 14 is connected to the television 101, the smartphone 1 may perform notification of incoming communication, in an aspect different from an ordinary notification aspect. An ordinary ringtone melody may have a large data volume, taking time for replay processing. Therefore, when a ringtone is output in a state where the external interface 14 is connected to the television 101, the smartphone 1 may be configured to perform notification of incoming communication by using a ringtone with a small data volume to save time for replay processing, instead of using an ordinary ringtone melody.

When the control unit 23 acquires the volume level of the sound to be output from the sound output unit 101a, and in a case in which the volume level of the sound is higher than a predetermined threshold value, the control unit 23 may be configured to execute control so as to suppress the volume level of the sound to be output from the sound output unit 101a. The predetermined threshold value is a preset value to the extent not to disturb a telephone call and notification by the notification unit 21. A user may be allowed to change the predetermined value.

For example, the control unit 23 refers to a volume level (of sound), which is currently set to the television 101, via the external interface 14. In a case in which the volume level notified from the television 101 is higher than the predetermined threshold value, the control unit 23 transmits a control signal so as to suppress the volume level of the sound to be output from the sound output unit 101a. The television 101 suppresses the volume level of the sound to be output from the sound output unit 101a, on the basis of the control signal that is transmitted from the smartphone 1.

Therefore, when incoming communication is received in a state where the external interface 14 is connected to the television 101, the smartphone 1 suppresses the sound to be output from the sound output unit 101a in accordance with the volume level that is set to the television 101, and can therefore reliably remind the user of the reception of the incoming communication without failing to hear the notification by the notification unit 21. Even during the phone call after receiving the incoming communication, the smartphone 1 continues suppressing the sound to be output from the sound output unit 101a; therefore, a phone conversation can be made in a satisfactory manner.

The smartphone 1 may be configured to include a sound collecting unit 26, as shown in FIG. 8. In a case in which the volume level of the sound collected with the sound collecting unit 26 is higher than the predetermined threshold value, the control unit 23 executes control so as to suppress the volume level of the sound to be output from the sound output unit 101a. The predetermined threshold value is a preset value to the extent not to disturb a telephone call and notification by the notification unit 21. A user may be allowed to change the predetermined value.

The sound collecting unit 26 is a microphone. In FIG. 9, the sound collecting unit 26 is arranged in a lower middle of a front face 1A of the smartphone 1, which is an example, and is not limited to the lower middle of the front face.

The sound collecting unit 26 may be configured to be always driven, or may be configured to be driven at the timing of receiving incoming communication, or may be configured to be driven at the timing determined by the polling.

Therefore, when incoming communication is received in a state where the external interface 14 is connected to the television 101, in a case in which the volume level of the sound collected with the sound collecting unit 26 is higher than a predetermined threshold value, the smartphone 1 suppresses the sound to be output from the sound output unit 101a, and can therefore reliably remind the user of the reception of the incoming communication without failing to hear the notification by the notification unit 21. Even during the phone call after receiving the incoming communication, the smartphone 1 continues suppressing the sound to be output from the sound output unit 101a; therefore, a phone conversation can be made in a satisfactory manner.

The control unit 23 may be configured to execute control such that, when a telephone call is made in response to an incoming call, and the telephone call is finished, then the suppressed volume level is restored to the original volume level. For example, in a case in which the control unit 23 is controlling the sound output unit 101a to mute the output, at the timing of detecting termination of the telephone call, the control unit 23 transmits a signal canceling the mute to the television 101. When the television 101 receives the signal canceling the mute, the television 101 cancels the mute, and resumes outputting the sound from the sound output unit 101a.

In a case in which the control unit 23 is controlling the volume level to be attenuated by 3 dB, at the timing of detecting termination of the telephone call, the control unit 23 transmits a signal attenuating the volume level by 3 dB to the television 101. When the television 101 receives a signal increasing the volume level, the control unit 23 controls the volume level to be increased, i.e. to the original volume level.

Therefore, when incoming communication is received in a state where the external interface 14 is connected to the television 101, the smartphone 1 suppresses the volume level of the television 101, thereby enabling the user to make a phone conversation in a satisfactory manner; and the smartphone 1 restores the suppressed volume level of the television 101 to the original volume level, thereby enabling the user to enjoy watching the television 101.

As shown in FIG. 8, a smartphone 1 is provided with the external interface 14, the communication unit 22, the notification unit 21, and the control unit 23. The external interface 14 conforms to a predetermined signal transmission standard (for example, a transmission standard for video signals and/or sound signals), and is connected to an external device. The predetermined signal transmission standard is, for example, an HDMI standard or an MHL standard. As shown in FIG. 9, the present embodiment assumes an aspect, in which a television 101 as an external device and the smartphone 1 are mutually connected via a cable 102. The interface of the television 101 and the external interface 14 of the smartphone 1 are described as conforming to an identical standard, but the present disclosure is not limited thereto.

For example, the interface of the television 101 may conform to the HDMI standard, whereas the external interface 14 of the smartphone 1 may conform to the MHL standard. In a case of such a configuration, as shown in FIG. 10, the cable 102 is provided with an adapter 102a for mutually converting HDMI and MHL, in which one terminal 102b is connected to the television 101 by supporting the HDMI standard, and the other terminal 102c is connected to the smartphone 1 by supporting the MHL standard.

The communication unit 22 supports cellular phone communication standards such as 2G, 3G and 4G. The cellular phone communication standards include LTE (Long Term Evolution) (registered trademark), W-CDMA, CDMA2000, PDC, GSM (registered trademark), PHS (Personal Handyphone System) (registered trademark), etc.

The notification unit 21 is a constituent element for externally notifying occurrence of an event such as incoming communication, and is considered to be, for example, a speaker for outputting a ringtone, a vibrator for conducting vibration, a light emitting portion for emitting light, etc.

When incoming communication is received in a state where the external interface 14 is connected to the television 101, the control unit 23 acquires sound information, which is output from the sound output unit 101a provided to the television 101; searches for a segment where the volume level of the sound to be output from the sound output unit 101a falls below a predetermined threshold value, based on the sound information; and controls the notification unit 21 to perform notification of the incoming communication in the segment.

The sound information is described as meaning a waveform (sound wave) of the sound after being output from the sound output unit 101a into the space, but is not limited to thereto, and may be, for example, a signal (electric signal) of the sound before being output from the sound output unit 101a into the space. In a case in which the sound signal is an electric signal, the control unit 23 acquires, for example, sound information which is output from the sound output unit 101a provided to the television 101, via the external interface 14.

Figure 11:
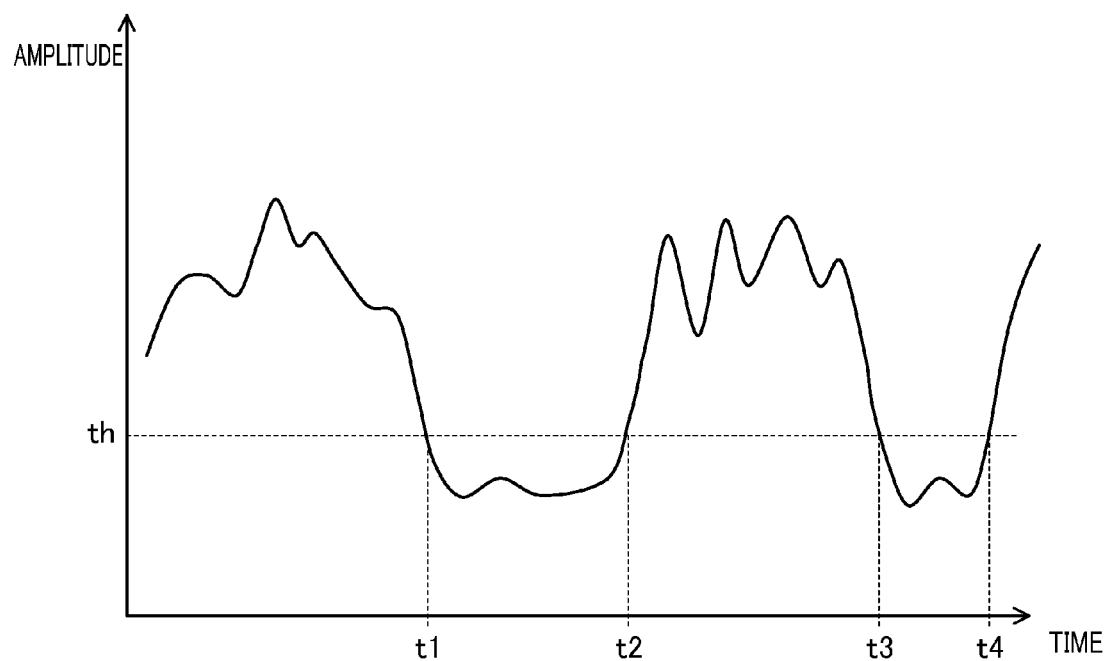
FIG. 11 is a diagram for illustrating processing of searching for segments below a predetermined threshold value, by analyzing acquired sound information.

For example, as shown in FIG. 11, the control unit 23 analyzes the acquired sound information, searches for segments (segment between t1 and t2, and segment between t3 and t4 in FIG. 11) below a predetermined threshold value (th in FIG. 11), and performs notification in the segments.

In this manner, the smartphone 1 can reliably remind the user of the reception of the incoming communication without failing to hear the notification by the notification unit 21. Note that, in a case in which a telephone call is initiated in response to incoming communication, the smartphone 1 may execute control so as to suppress the volume level of the sound to be output from the sound output unit 101a. In such a configuration, during a telephone call, the smartphone 1 can maintain the telephone call in a satisfactory manner. The smartphone 1 may be configured to restore the suppressed volume level of the television 101 to the original volume level, after terminating the telephone call. With such a configuration, the smartphone 1 can enable the user to continuously enjoy watching the television 101.

The smartphone 1 may be configured to include a sound collecting unit 26, as shown in FIG. 8. The control unit 23 acquires sound information by using the sound collecting unit 26. When incoming communication is received in a state where the external interface 14 is connected to the television 101, the control unit 23 acquires sound information by using the sound collecting unit 26; searches for a segment where the volume level of the sound to be output from the sound output unit 101a falls below a predetermined threshold value, based on the sound information; and controls the notification unit 21 to perform notification of the incoming communication in the segment.

In this manner, the smartphone 1 can reliably remind the user of the reception of the incoming communication without failing to hear the notification by the notification unit 21.

When incoming communication is received in a state where the external interface 14 is connected to an external device, the control unit 23 may be configured to acquire sound information, which is included in the broadcast waves received by the television 101, via the external interface 14; search for a segment where the volume level of the sound to be output from the sound output unit 101a falls below a predetermined threshold value, based on the sound information; and control the notification unit 21 to perform notification of the incoming communication in the segment. The sound information included in the broadcast waves refers to a signal (electric signal) of the sound before being output from the sound output unit 101a into the space.

The television 101 separates the received digital broadcast waves into video signals and sound signals; executes decode processing on each signal; outputs a video picture to the display; and outputs sound from the sound output unit 101a.

The control unit 23 acquires a sound signal before being output from the sound output unit 101a into the space, as sound information; and searches in advance for a segment where the volume level of the sound to be output from the sound output unit 101a falls below a predetermined threshold value. The control unit 23 may be configured to acquire a signal of sound before being output from the sound output unit 101a into the space, as sound information; acquire a volume level (of sound) which is currently set to the television 101; and search in advance for a segment where the volume level of the sound to be output from the sound output unit 101a falls below a predetermined threshold value, on the basis of the sound information and the volume level which are acquired in this manner.

With such a configuration, the smartphone 1 can recognize in advance a segment where the volume level of the sound to be output from the sound output unit 101a falls below a predetermined threshold value; therefore, the smartphone 1 can accurately perform notification by the notification unit 21, and can reliably remind the user of the reception of the incoming communication.

The smartphone 1 may be configured to include a receiving unit 27 and a processing unit 28, as shown in FIG. 8.

The receiving unit 27 has a function of receiving a frequency band between 470 MHz to 770 MHz (function of receiving so-called ground-based digital broadcasting). The processing unit 28 activates a television viewing application in accordance with a predetermined user operation; and when a predetermined channel is designated, the processing unit 28 refers to a table of correspondence between channels and frequencies, and performs tuning to a frequency corresponding to the designated channel from the frequency band between 470 MHz to 770 MHz. The processing unit 28 executes predetermined signal processing such as demodulating processing and decoding processing on the signals received by the tuning; executes replay processing on the processed signals; and performs replay by using the television viewing application.

When incoming communication is received in a state where the external interface 14 is connected to the television 101, the control unit 23 receives broadcast waves, which are identical to the broadcast waves currently viewed by the television 101, by way of the receiving unit 27. The control unit 23 searches for a segment where the volume level of the sound to be output from the sound output unit 101a provided to the television 101 falls below a predetermined threshold value, on the basis of the sound information included in the received broadcast waves; and controls the notification unit 21 to perform notification of the incoming communication in the segment.

More specifically, when incoming communication is received in a state where the external interface 14 is connected to the television 101, the control unit 23 requests channel information of a currently selected channel from the television 101. In response to the request from the control unit 23, the television 101 transmits the channel information of the currently selected channel. The processing unit 28 performs tuning to the frequency corresponding to the identical channel, on the basis of the channel information transmitted from the television 101. The processing unit 28 executes predetermined signal processing such as demodulating processing and decoding processing on the sound signals received by the tuning.

The control unit 23 refers to a volume level (of sound), which is currently set to the television 101, via the external interface 14.

The control unit 23 searches for a segment where the volume level of the sound to be output from the sound output unit 101a falls below a predetermined threshold value; and controls the notification unit 21 to perform notification of the incoming communication in the segment, on the basis of the sound signals processed by the processing unit 28, and the volume level.

With such a configuration, the smartphone 1 can recognize a segment where the volume level of the sound to be output from the sound output unit 101a falls below a predetermined threshold value; therefore, the smartphone 1 can accurately perform notification by the notification unit 21, and can reliably remind the user of the reception of the incoming communication.

Figure 12:
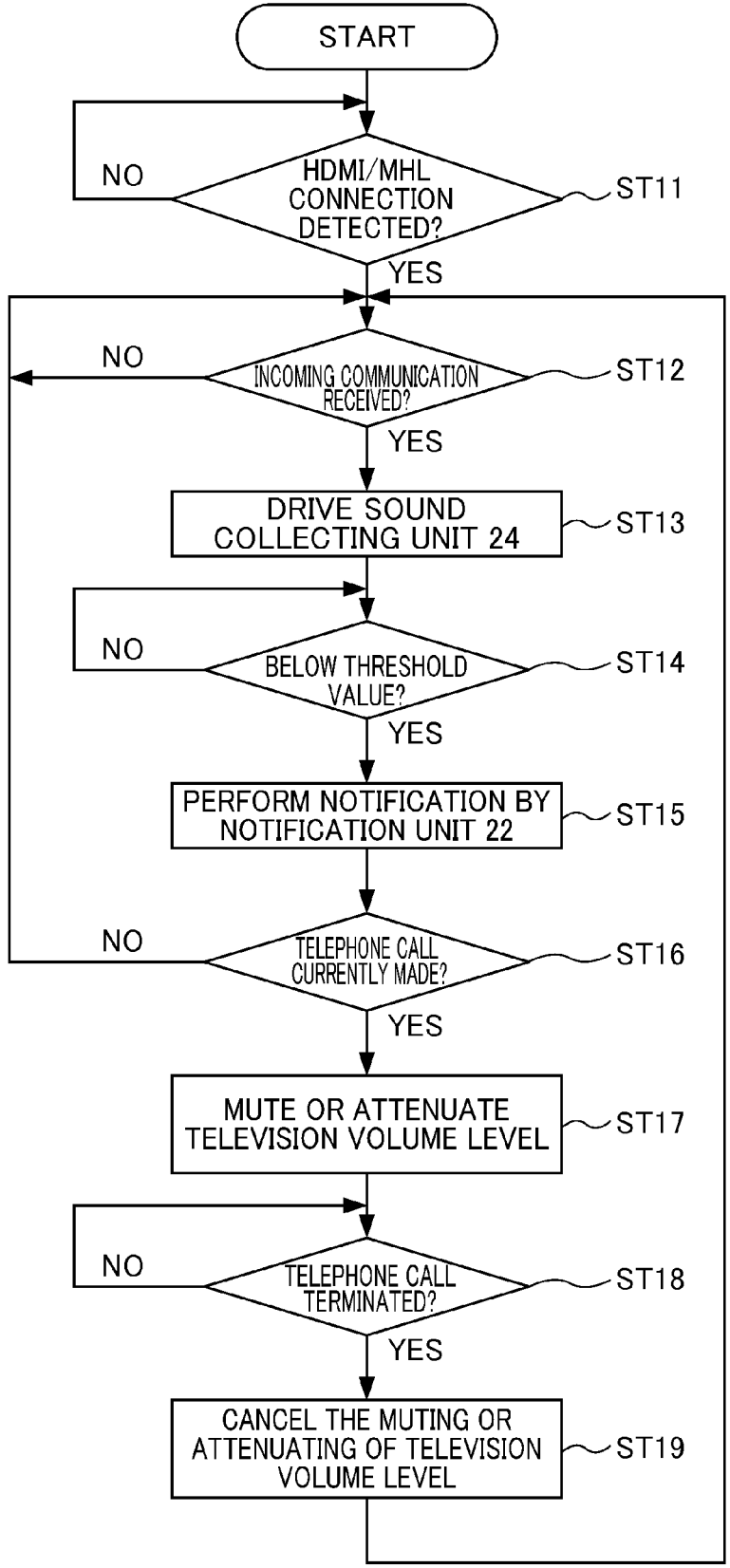
FIG. 12 is a flowchart for illustrating operations of the smartphone.

Next, operations of the smartphone 1 are described with reference to a flowchart shown in FIG. 12. In the following description, the external device is described as the television 101. In Step ST11, the control unit 23 determines whether the television 101 is connected via the external interface 14. More specifically, the control unit 23 determines whether the television 101 is connected via the external interface 14, based on whether HDMI or MHL standard connection is detected. In a case in which the control unit 23 determines that the television 101 is connected (Yes), the processing advances to Step ST12. In a case in which the control unit 23 determines that the television 101 is not connected (No), the processing of Step ST11 is repeated.

In Step ST12, the control unit 23 determines whether incoming communication is received. In a case in which the control unit 23 determines that incoming communication is received (Yes), the processing advances to Step ST13; and in a case in which the control unit 23 determines that incoming communication is not received (No), the present processing is repeated.

In Step ST13, the control unit 23 drives the sound collecting unit 26. Note that the control unit 23 may be configured to drive the sound collecting unit 26, not at the timing of receiving incoming communication, but always or at the timing determined by the polling.

In Step ST14, the control unit 23 determines whether the volume level of the sound collected with the sound collecting unit 26 is below a predetermined threshold value. In a case in which the control unit 23 determines that the volume level is below the predetermined threshold value (Yes), the processing advances to Step ST15; and in a case in which the control unit 23 determines that the volume level is not below the predetermined threshold value (No), the present processing is repeated.

In Step ST15, the control unit 23 controls the notification unit 21 to notify that incoming communication is received. In Step ST16, the control unit 23 determines whether a telephone call is currently made in response to the incoming communication. In a case in which the control unit 23 determines that a telephone call is currently made (Yes), the processing advances to Step ST17; and in a case in which the control unit 23 determines that a telephone call is not currently made (No), the processing returns to Step ST12.

In Step ST17, the control unit 23 executes control so as to suppress the volume level of the sound to be output from the sound output unit 101a. For example, the control unit 23 controls the volume level of the television 101 to be muted or attenuated.

In Step ST18, the control unit 23 determines whether the telephone call is terminated. In a case in which the control unit 23 determines that the telephone call is terminated (Yes), the processing advances to Step ST19; and in a case in which the control unit 23 determines that the telephone call is not terminated (No), the present processing is repeated.

In Step ST19, the control unit 23 cancels the suppressing control in Step ST17, and the processing returns to Step ST12.

In this manner, the smartphone 1 can reliably remind the user of the reception of the incoming communication without failing to hear the notification by the notification unit 21; maintain the telephone call in a satisfactory manner; and enable the user to continuously enjoy watching the television 101 after terminating the telephone call.

Note that, in the present embodiment, the external device has been described as the television 101; however, the present disclosure is not limited thereto, as long as notification of incoming communication can be performed. For example, examples of the external device may include a stereo component, a PC, etc. In the present embodiment, incoming communication has been described as an incoming telephone call, but is not limited thereto, and may be incoming email, for example.

In the present embodiment, the operations at the time of receiving incoming communication have been described, but are not limited thereto, and operations may suppress the volume level of the sound to be output from the sound output unit 101a, at the time of making an outgoing call. More specifically, in a state where the smartphone 1 is connected to the external device by using the external interface 14, when movement is detected by an acceleration detection unit, or when an operation of making an outgoing call is performed, the smartphone 1 executes control so as to suppress the volume level of the sound to be output from the sound output unit 101a.

In the present embodiment, the configurations and operations of the smartphone have been mainly described, but are not limited thereto, and may be configured as a control method and program, which are provided with each constituent element, and execute control so as to reliably remind the user of reception of incoming communication, in a state of being connected to the external device by using the external interface 14.

Furthermore, an embodiment may be implemented by recording a program for implementing functions of a smartphone in a computer-readable recording medium, and causing a computer system to read and execute the program recorded in the recording medium.

The "computer system" as used herein includes OS and hardware such as peripheral devices. The "computer-readable recording medium" refers to a portable medium such as a flexible disk, a magneto-optical disk, a ROM and a CD-ROM, and a storage device such as a hard disk incorporated into a computer system.

Furthermore, the "computer-readable recording medium" may also include a communication line for dynamically retaining a program over a short period of time, such as a communication line for transmitting a program over a network such as the Internet, or a communication line such as a telephone line; or volatile memory in a computer system serving as a server or client in this case for retaining a program over a certain period of time. The program may be intended to implement a part of the aforementioned functions, or may be able to implement the aforementioned functions in combination with a program that has been already recorded in a computer system.

In the present embodiment, the external interface 14 has been described as a terminal, to which another device is connected; however, the present disclosure is not limited thereto, and the external interface may be a wireless interface conforming to a wireless communication standard such as Bluetooth (registered trademark) and WiFi (registered trademark). Therefore, the electronic device of the disclosure of the present application may be communicatively connected to an external device by wireless communication conforming to a wireless communication standard. Similarly, an interface 202 of the external device may also be a wireless interface.

In the present embodiment, when incoming communication is received in a state where the external interface is connected to the television, the control unit acquires sound information, which is output from the sound output unit provided to the television; searches for a segment where the volume level of the sound to be output from the sound output unit falls below a predetermined threshold value, based on the sound information; and controls the notification unit to perform notification of the incoming communication in the segment; however, the control unit may perform notification of incoming communication in the entire segments where the volume level of the sound to be output from the sound output unit falls below predetermined threshold value, or may perform notification of incoming communication in a part of the segments.

Third Embodiment

As shown in FIG. 13, a smartphone 1 is provided with an external interface 14, a notification unit 21, a control unit 23, and an acceleration sensor unit 24. The external interface 14 conforms to a predetermined signal transmission standard (for example, a transmission standard for video signals and/or sound signals), and is connected to an external device. The predetermined signal transmission standard is, for example, an HDMI standard or an MHL standard.

The present embodiment assumes: a utilization aspect (first utilization aspect) as shown in FIG. 14A, in which a television 101 as an external device and a smartphone 1 are mutually connected via a cable 102; and a utilization aspect (second utilization aspect) as shown in FIG. 14B, in which a PC 201 as an external device and the smartphone 1 are mutually connected via a cable 202.

In the first utilization, it is possible to conceive a utilization aspect of utilizing characteristics of the television 101, which has a screen that is larger than the display 2A of the smartphone 1, and which has a speaker that can output loud sound. For example, it is possible to conceive a utilization aspect, in which the smartphone 1 transmit contents such as a movie to the television 101; and the television 101 outputs video and sound to be viewed. It is possible to conceive a utilization aspect, in which the smartphone 1 transmits video and sound of a game application to the television 101; the television 101 outputs the video and sound; and an UI for operating the game application is displayed on the display 2A.

In the second utilization, it is possible to conceive utilization aspects such as: transmitting data stored in the PC 201 to the smartphone 1; transmitting data stored in the smartphone 1 to the PC 201; and synchronizing the data stored in the PC 201 with the data stored in the smartphone 1.

In the following description, the external device is described as the television 101. The interface of the television 101 and the external interface 14 of the smartphone 1 are described as conforming to an identical standard, but the present disclosure is not limited thereto.

Figure 15:
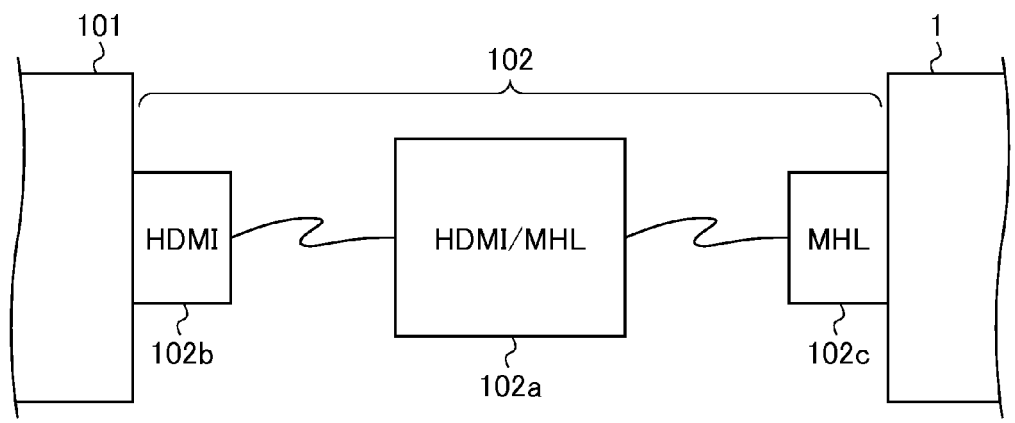
FIG. 15 is a diagram showing a configuration of the cable.

For example, the interface of the television 101 may conform to the HDMI standard, whereas the external interface 14 of the smartphone 1 may conform to the MHL standard. In a case of such a configuration, as shown in FIG. 15, the cable 102 is provided with an adapter 102a for mutually converting HDMI and MHL, in which one terminal 102b is connected to the television 101 by supporting the HDMI standard, and the other terminal 102c is connected to the smartphone 1 by supporting the MHL standard.

For example, the acceleration sensor 24 detects a direction and level of acceleration acting on the smartphone 1, and outputs the result of detection to the control unit 23. The acceleration sensor unit 24 is, for example, a three-axis (three-dimensional) sensor for detecting acceleration in an X-axis direction, a Y-axis direction and a Z-axis direction, and as such the acceleration sensor unit 24 measures acceleration (a) (acceleration (a)=force (F)/mass (m)), on the basis of a force (F) externally applied to the smartphone 1, and mass (m) of the smartphone 1.

Note that the acceleration sensor unit 24 is not limited to a piezoelectric element (piezoelectric type), but may be composed of: a sensor such as a piezoresistive sensor; a capacitive sensor, an MEMS (Micro Electro Mechanical System) type, which is based on a thermal detection scheme; a servo type, in which a movable coil is returned by a feedback electric current; or a strain gauge type, in which a strain gauge measures distortion generated by acceleration.

When the control unit 23 is currently performing communication with an external device via the external interface 14, in a case in which a detection value detected by the acceleration sensor unit 24 is higher than a predetermined threshold value, the notification unit 21 notifies that communication is currently being performed with the external device via the external interface 14.

The predetermined threshold value is a level of a detection value, which could be detected by the acceleration sensor unit 24 when a user picks up the smartphone 1 with a hand, which was placed on a desk.

When the smartphone 1 is lifted by a user, the notification unit 21 notifies that communication is currently being performed with the external device via the external interface 14; therefore, the smartphone 1 can remind the user of the fact that communication is currently being performed. In this manner, in a state where the smartphone 1 is currently performing communication with an external device by using the external interface 14, the smartphone 1 executes control such that the connection state is not inadvertently disconnected.

Figure 16:
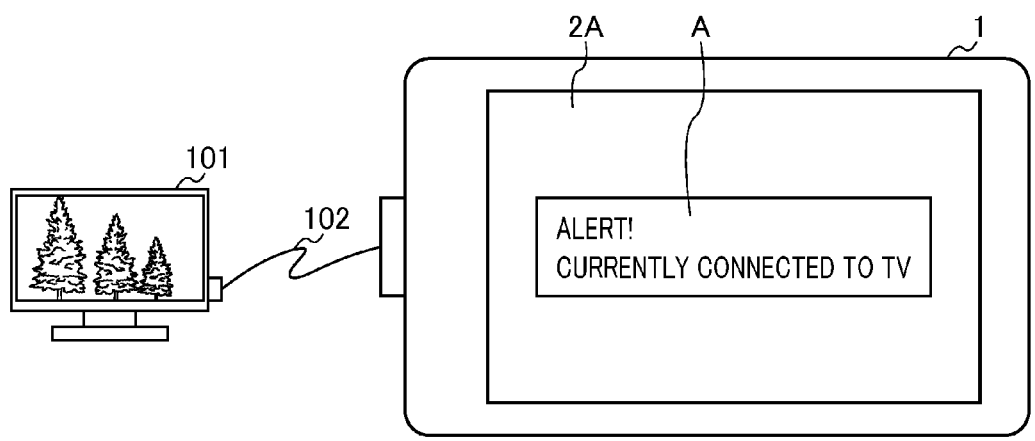
FIG. 16 is a diagram schematically showing a state where a predetermined message is displayed on the display of the smartphone.

The notification unit 21 may be a display 2A. In a state where the control unit 23 is currently performing communication with an external device via the external interface 14, in a case in which a detection value detected by the acceleration sensor unit 24 is higher than a predetermined threshold value, the control unit 23 controls the display 2A to display a message indicating that communication is currently being performed with the external device via the external interface 14, as shown in FIG. 16.

Note that the message "Alert! Currently connected to TV" (message A shown in FIG. 16) is an example of a message, without limitation thereto. Since the type of data being transmitted to the television 101 is known by the smartphone 1, the message may be, for example, "Alert! Currently transmitting contents to TV" or the like.

Note that the notification unit 21 may denote a concept including units such as a speaker for outputting sound, a vibrator for conducting vibration, and a light emitting portion for emitting light.

Descriptions are provided for operations of the control unit 23 in a case in which the notification unit 21 is a speaker. In a state where the control unit 23 is currently performing communication with an external device via the external interface 14, in a case in which a detection value detected by the acceleration sensor unit 24 is higher than a predetermined threshold value, the speaker outputs sound data indicating that communication is currently being performed with the external device via the external interface 14.

Descriptions are provided for operations of the control unit 23 in a case in which the notification unit 21 is a vibrator. In a state where the control unit 23 is currently performing communication with an external device via the external interface 14, in a case in which a detection value detected by the acceleration sensor unit 24 is higher than a predetermined threshold value, the control unit 23 controls the vibrator to vibrate in a vibration pattern indicating that communication is currently being performed with the external device via the external interface 14.

Descriptions are provided for operations of the control unit 23 in a case in which the notification unit 21 is a light emitting portion. In a state where the control unit 23 is currently performing communication with an external device via the external interface 14, in a case in which a detection value detected by the acceleration sensor unit 24 is higher than a predetermined threshold value, the control unit 23 controls the light emitting portion to emit light in a light emitting pattern indicating that communication is currently being performed with the external device via the external interface 14.

Note that the control unit 23 may be configured such that a plurality of constituent elements such as the display 2A and the speaker perform notification that the television 101 is connected to the external interface 14.

When the smartphone 1 is lifted by a user, the notification unit 21 notifies that communication is currently being performed with the external device via the external interface 14; therefore, the smartphone 1 can remind the user of the fact that communication is currently being performed. In this manner, in a state where the smartphone 1 is performing communication with an external device via the external interface 14, the smartphone 1 executes control such that the connection state is not inadvertently disconnected.

The control unit 23 has a function of switching the display 2A to an off state, in a case in which a predetermined condition is satisfied. The predetermined condition refers to cases in which, for example, the display 2A is in an on state and did not receive any operations for more than a predetermined period of time. The smartphone 1 can save electric power by this function.

When the display is in the off state, and the control unit 23 is currently performing communication with an external device via the external interface 14, in a case in which a detection value detected by the acceleration sensor unit 24 is higher than a predetermined threshold value, the control unit 23 switches the display to the on state, and controls the display 2A to display a message indicating that communication is currently being performed with the external device via the external interface 14.

When the smartphone 1 is lifted by a user, the display 2A displays a message indicating that the smartphone 1 is in a state of currently performing communication with the external device via the external interface 14 (indicating that communication is currently being performed with the external device via the external interface 14); therefore, the smartphone 1 can remind the user of the fact that communication is currently being performed. In this manner, in a state where the smartphone 1 is performing communication with an external device via the external interface 14, the smartphone 1 executes control such that the connection state is not inadvertently disconnected.

Figure 17:
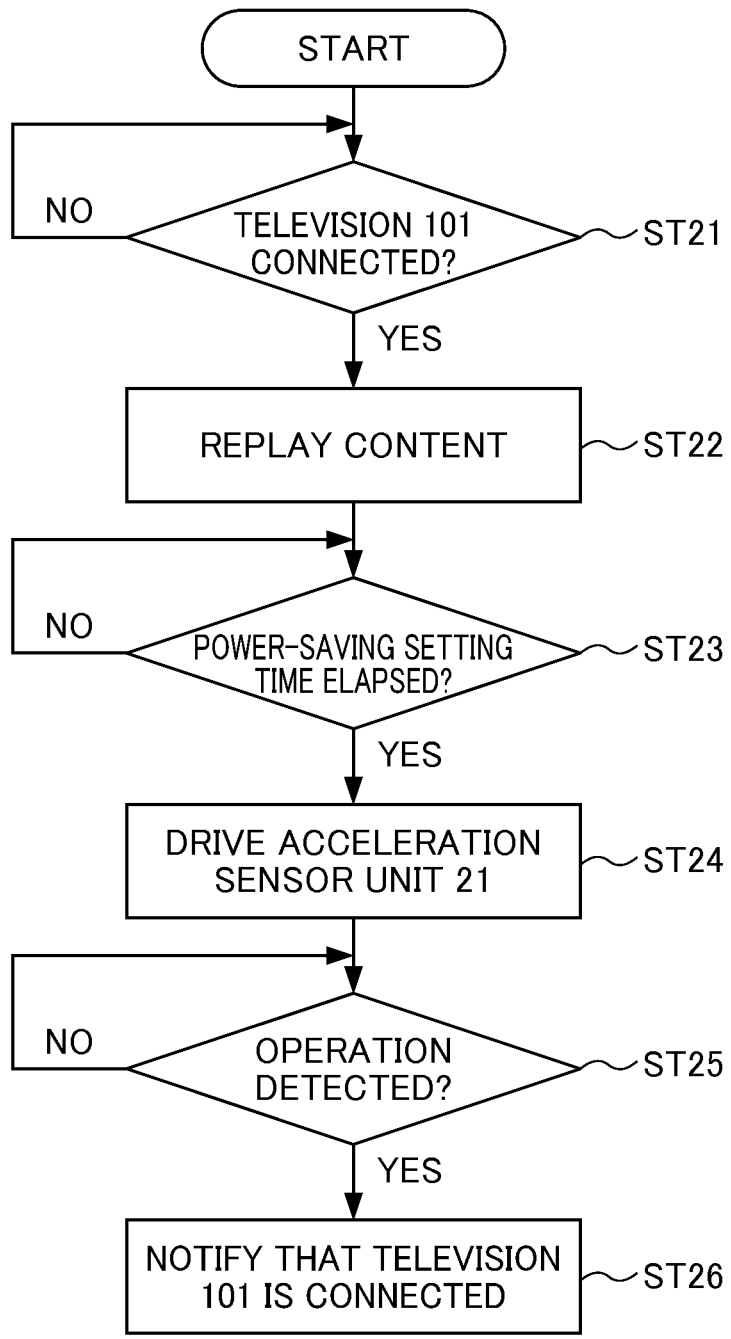
FIG. 17 is a flowchart for illustrating operations of the smartphone.

Next, operations of the smartphone 1 are described with reference to a flowchart shown in FIG. 17. In the following description, the external device is described as the television 101. Descriptions are provided by assuming a usage aspect, in which the smartphone 1 transmits a movie content to the television 101.

In Step ST21, the control unit 23 determines whether the television 101 is connected via the external interface 14. In a case in which the control unit 23 determines that the television 101 is connected (Yes), the processing advances to Step ST22. In a case in which the control unit 23 determines that the television 101 is not connected (No), the processing of Step ST21 is repeated.

In Step ST22, the control unit 23 replays the movie content to be output to the television 101. More specifically, in a case in which a user operation instructs the movie content to be replayed, the control unit 23 starts replay processing of the movie content. Since the control unit 23 is connected to the television 101 via the external interface 14, the control unit 23 outputs the processed video content to the television 101.

In Step ST23, the control unit 23 determines whether the power-saving setting time has elapsed. The power-saving setting time refers to a time for activating the function of switching the display 2A from the on state to the off state. The control unit 23 determines whether the power-saving setting time has elapsed since user operations ceased. In a case in which the control unit 23 determines that the power-saving setting time has elapsed (Yes), the processing advances to Step ST24; and in a case in which the control unit 23 determines that the power-saving setting time has not elapsed (No), the present processing is repeated.

In Step ST24, the control unit 23 causes the display 2A to transition from the on state to the off state, and drives the acceleration sensor unit 24. Note that the control unit 23 may drive the acceleration sensor unit 24 when the smartphone 1 is turned on; or the timing for driving the acceleration sensor unit 24 may be arbitrary timing.

In Step ST25, the control unit 23 determines whether the smartphone 1 is lifted by a user. More specifically, in a case in which a detection value detected by the acceleration sensor unit 24 is higher than a predetermined threshold value, the control unit 23 determines that the smartphone 1 is lifted by a user. In a case in which the control unit 23 determines that the smartphone 1 is lifted (Yes), the processing advances to Step ST26; and in a case in which the control unit 23 determines that the smartphone 1 is not lifted (No), the present processing is repeated.

In Step ST26, the control unit 23 causes the display 2A to transition from the off state to the on state, and causes the display 2A to notify that the smartphone 1 is in the state of currently performing communication with the external device via the external interface 14. Note that the control unit 23 is not limited to the notification by display 2A, and may cause a speaker to output sound based on predetermined sound data, may drive a vibrator to vibrate in a predetermined vibration pattern, or may control a light emitting portion to emit light in a predetermined light-emitting pattern.

When the smartphone 1 is lifted by a user, the display 2A displays a message indicating that communication is currently being performed with the external device via the external interface 14; therefore, the smartphone 1 can remind the user of the fact that communication is currently being performed. In this manner, in a state where the smartphone 1 is performing communication with an external device via the external interface 14, the smartphone 1 executes control such that the connection state is not inadvertently disconnected.

The smartphone 1 specifically achieves the following effects as well. While the smartphone 1 is connected to an external device (such as a television and a PC) through the HDMI, MHL or USB standard to display and replay contents, or perform data communication, the smartphone 1 is in a non-operational state, and the display 2A is switched to the off state by the power-saving mode. At this time, there may be a case in which a user inadvertently pulls the cable out of the external interface 14, without noticing that communication is currently being performed. The smartphone 1 according to the present embodiment can avoid such a case, by performing predetermined notification at the timing when a user picks up the smartphone 1 with a hand.

If the cable is pulled out during communication, which is currently being performed by connecting the smartphone 1 to a PC through the USB standard or the like (while transmitting data stored in the PC 201 to the smartphone 1; transmitting data stored in the smartphone 1 to the PC 201; or synchronizing the data stored in the PC 201 with the data stored in the smartphone 1), a communication error is caused to make it necessary to start all over again by resetting. The smartphone 1 according to the present embodiment can avoid such a situation by performing predetermined notification at the timing when a user picks up the smartphone 1 with a hand.

In a case in which a broadcast content is watched with the television 101, in a state where the television 101 is connected through the HDMI standard and/or the MHL standard to the smartphone 1 having the function capable of receiving television broadcast waves, it is not possible to determine at first glance which of the smartphone 1 or the television 101 is supplying the broadcast content; therefore, there may be a case in which a user inadvertently pulls the cable out, ending up with forcibly disconnecting the connection state.

If the connection state is forcibly disconnected while the smartphone 1 is outputting movie contents to the television 101, the replay processing is continued by the smartphone 1; therefore, when reconnection is established thereafter, it may take effort to search for a position where the playback was suspended. The smartphone 1 according to the present embodiment can also avoid such a situation by performing predetermined notification at the timing when a user picks up the smartphone 1 with a hand.

In the present embodiment, the configurations and operations of the smartphone have been mainly described, but are not limited thereto, and may be configured as a control method and program, which are provided with each constituent element, and execute control so as to avoid inadvertently disconnecting the connection state of currently performing communication with the external device via the external interface 14.

Furthermore, an embodiment may be implemented by recording a program for implementing functions of a smartphone in a computer-readable recording medium, and causing a computer system to read and execute the program recorded in the recording medium.

The "computer system" as used herein includes OS and hardware such as peripheral devices. The "computer-readable recording medium" refers to a portable medium such as a flexible disk, a magneto-optical disk, a ROM and a CD-ROM, and a storage device such as a hard disk incorporated into a computer system.

Furthermore, the "computer-readable recording medium" may also include a communication line for dynamically retaining a program over a short period of time, such as a communication line for transmitting a program over a network such as the Internet, or a communication line such as a telephone line; or volatile memory in a computer system serving as a server or client in this case for retaining a program over a certain period of time. The program may be intended to implement a part of the aforementioned functions, or may be able to implement the aforementioned functions in combination with a program that has been already recorded in a computer system.

In the present embodiment, the external interface (connector) 14 has been described as a terminal, to which another device is connected; however, the present disclosure is not limited thereto, and the external interface (connector) may be a wireless interface conforming to a wireless communication standard such as Bluetooth (registered trademark) and WiFi (registered trademark). Therefore, the electronic device of the disclosure of the present application may be communicatively connected to an external device by wireless communication conforming to a wireless communication standard.

In the present embodiment, the control unit controls the notification unit to notify that communication is currently being performed with an external device via a connector; however, as long as such notification is performed in a case in which a detection value detected by the acceleration sensor unit is higher than a predetermined threshold value when communication is currently being performed with an external device via a connector, the notification means and notification pattern are not limited; and notification by arbitrary notification means and patterns can be employed.

Fourth Embodiment

As shown in FIG. 18, a smartphone 1 is provided with an external interface 14, a control unit 23, and a replay processing unit 290. The external interface 14 conforms to a predetermined signal transmission standard (for example, a transmission standard for video signals and/or sound signals), and is connected to an external device. The predetermined signal transmission standard is, for example, an HDMI standard or an MHL standard.

The present embodiment assumes: a utilization aspect (first utilization aspect) as shown in FIG. 19A, in which a television 101 as an external device and a smartphone 1 are mutually connected via a cable 102; and a utilization aspect (second utilization aspect) as shown in FIG. 19B, in which a PC 201 as an external device and the smartphone 1 are mutually connected via a cable 202.

In the first utilization, it is possible to conceive a utilization aspect of utilizing characteristics of the television 101, which has a screen that is larger than the display 2A of the smartphone 1, and which has a speaker that can output loud sound. For example, it is possible to conceive a utilization aspect, in which the smartphone 1 transmit contents such as a movie to the television 101; and the television 101 outputs video and sound to be viewed. It is possible to conceive a utilization aspect, in which the smartphone 1 transmits video and sound of a game application to the television 101; the television 101 outputs the video and sound; and an UI for operating the game application is displayed on the display 2A.

In the second utilization, it is possible to conceive utilization aspects such as: transmitting data stored in the PC 201 to the smartphone 1; and transmitting data stored in the smartphone 1 to the PC 201.

In the following description, the external device is described as the television 101. The interface of the television 101 and the external interface 14 of the smartphone 1 are described as conforming to an identical standard, but the present disclosure is not limited thereto.

Figure 20:
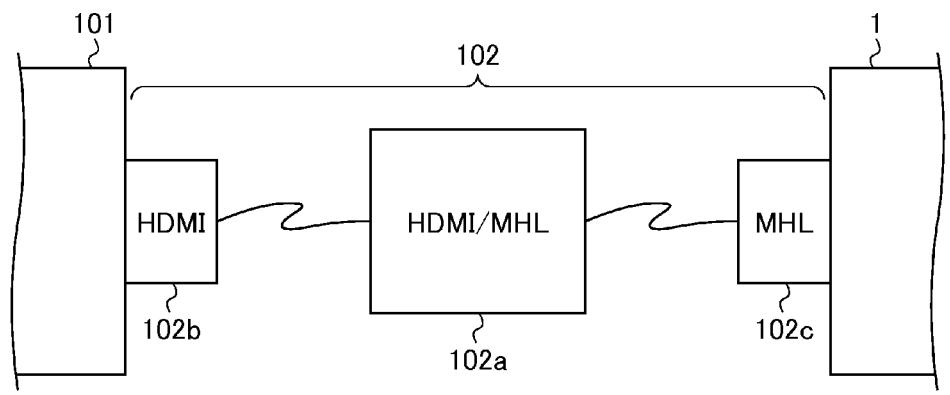
FIG. 20 is a diagram showing a configuration of the cable.

For example, the interface of the television 101 may conform to the HDMI standard, whereas the external interface 14 of the smartphone 1 may conform to the MHL standard. In a case of such a configuration, as shown in FIG. 20, the cable 102 is provided with an adapter 102a for mutually converting HDMI and MHL, in which one terminal 102b is connected to the television 101 by supporting the HDMI standard, and the other terminal 102c is connected to the smartphone 1 by supporting the MHL standard.

The replay processing unit 29 executes replay processing of contents. More specifically, in response to a user operation, the control unit 23 activates an application for managing contents (hereinafter referred to as a content application), and selects a content to be replayed. In response to an instruction by the replay application, the replay processing unit 29 executes replay processing such as decode processing on the selected content. Note that the content is assumed to be composed of video data and audio data, but is not limited thereto, and may be static image data, etc. The smartphone 1 ordinarily displays replay-processed video on the display 2A, and outputs sound from the speaker.

In a state where an external device is connected to the external interface 14, the control unit 23 transmits the content, which has been replay-processed by the replay processing unit 29, to the television 101.

When the connection state between the external interface 14 and the television 101 is disconnected while the replay processing unit 29 is executing the replay-processing, the control unit 23 suspends the replay processing by the replay processing unit 29.

In a case in which the connection state is disconnected and resumed within a predetermined period of time, the control unit 23 resumes the replay processing by the replay processing unit 29, and transmits the replay-processed content to the television 101.

Therefore, in a state where the smartphone 1 is connected to the television 101 by using the external interface 14, even if the connection state is disconnected by a user's erroneous operation while transmitting the content to the television 101, the transmission of the content is resumed from the disconnected position, on condition that the connection state is resumed within a predetermined period of time; therefore, the user can continuously enjoy watching the content.

The control unit 23 may be configured to change the predetermined period of time (guard time), depending on the type of content, which is replay-processed by the replay processing unit 29. The replay processing unit 29 may have different replay processing load and different electric power consumption, depending on the type of content. For example, the replay processing of moving image data requires higher electric power consumption than the replay processing of static image data.

In a case in which the replay processing unit 29 is replay-processing a content of moving image data, the control unit 23 sets the predetermined period of time to t1; and in a case in which the replay processing unit 29 is replay-processing a content of static image data, the control unit 23 sets the predetermined period of time to t2 (t1<t2).

In this manner, the control unit 23 changes the period of time from disconnecting the connection state until resuming the connection state, depending on the type of content; therefore, the load on the rechargeable battery can be reduced.

As described above, the smartphone 1 is provided with the display 2A. The control unit 23 may be configured to display a message on the display 2A indicating that the replay processing of the content is suspended, in a case in which the connection state is not resumed within a predetermined period of time, after the connection state is disconnected, or after the connection state is disconnected and the replay processing by the replay processing unit 29 is suspended.

Figure 21:
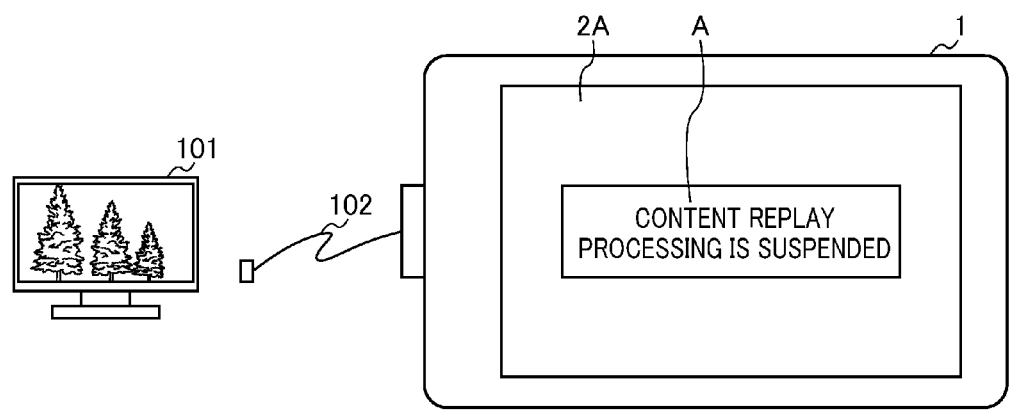
FIG. 21 is a diagram schematically showing a state where a predetermined message is displayed on the display of the smartphone.

Note that the message "content replay processing is suspended" (message A shown in FIG. 21) is an example of a message, without limitation thereto.

For example, when the user wishes to suspend the replay processing of the content, the user can suspend the replay processing of the content, by merely disconnecting the connection state with the television 101. In this manner, the smartphone 1 can accept suspension of the replay processing of the content without requiring complicated user operations, and the smartphone 1 displays the suspension message on the display 2A; therefore, the smartphone 1 can also notify the user of the fact that the replay processing is suspended.

Figure 22:
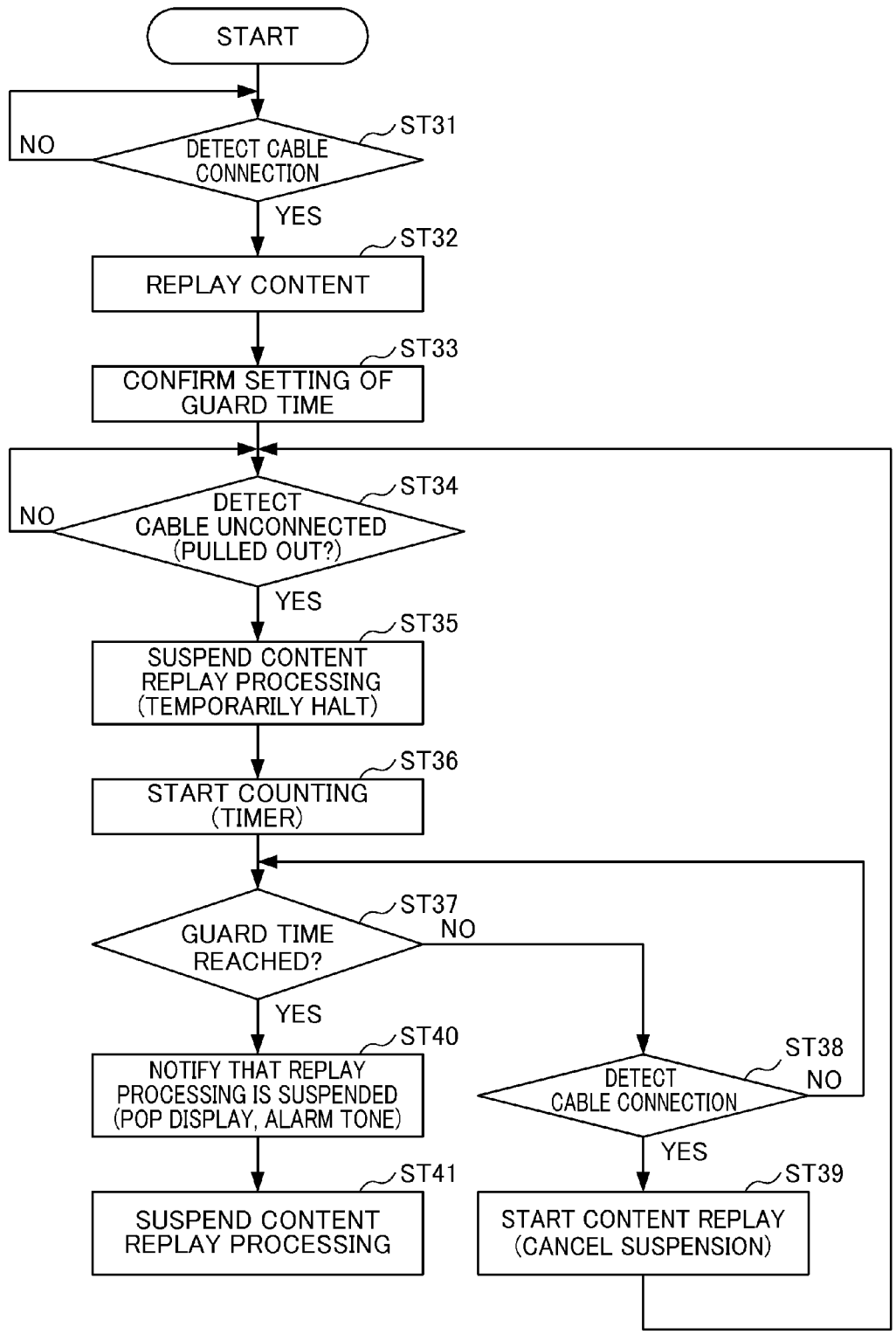
FIG. 22 is a flowchart for illustrating operations of the smartphone.

Next, operations of the smartphone 1 are described with reference to a flowchart shown in FIG. 22. In the following description, the external device is described as the television 101. Descriptions are provided by assuming a usage aspect, in which the smartphone 1 transmits a movie content to the television 101

In Step ST31, the control unit 23 determines whether the cable 102 is connected to the external interface 14. In a case in which the control unit 23 determines that the cable 102 is connected to the external interface 14 (Yes), the processing advances to Step ST32; and in a case in which the control unit 23 determines that the cable 102 is not connected to the external interface 14 (No), the processing of Step ST31 is repeated.

In Step ST32, in response to a user operation, the control unit 23 causes the replay processing unit 29 to execute replay processing of the content. The smartphone 1 transmits the replay-processed content to the television 101 via the cable 102. The television 101 displays the transmitted content.

In Step ST33, the control unit 23 confirms the setting of the guard time. The guard time is a period of time from disconnecting the connection state until resuming the connection state; and different guard time may be set, depending on the type of content, which is replay-processed by the replay processing unit 29. The guard time may be configured to be user-specifiable.

In Step ST34, the control unit 23 determines whether the cable 102 becomes unconnected. For example, in a case in which the cable 102 is removed from the external interface 14, or in a case in which the cable 102 is removed from the interface of the television 101, the control unit 23 determines that the cable 102 becomes unconnected. In a case in which the control unit 23 determines that the cable 102 becomes unconnected (Yes), the processing advances to Step ST35; and in a case in which the control unit 23 determines that the cable 102 does not become unconnected (No), the processing of Step ST34 is repeated.

In Step ST35, the control unit 23 controls the replay processing unit 29 to suspend (temporarily halt) the replaying of the content. Since the smartphone 1 transmits no contents to the television 101, a message such as "No Signal" is displayed on the television 101.

In Step ST36, the control unit 23 starts counting.

In Step ST37, the control unit 23 determines whether the counting started in Step ST36 reaches the guard time confirmed in Step ST33. In a case in which the control unit 23 determines that the counting reaches the guard time (Yes), the processing advances to Step ST40; and in a case in which the control unit 23 determines that the counting does not reach the guard time (No), the processing advances to Step ST38.

In Step ST38, the control unit 23 determines whether connection of the cable 102 is detected. In a case in which the control unit 23 determines that connection of the cable 102 is detected (Yes), the processing advances to Step ST39; and in a case in which the control unit 23 determines that connection of the cable 102 is not detected (No), the processing returns to Step ST37.

In Step ST39, the control unit 23 controls the replay processing unit 29 to resume the replaying of the content. Note that the control unit 23 executes control so as to resume the replay processing of the content from the position where the replay processing was suspended in Step ST35.

In Step ST40, the control unit 23 notifies that the replay processing of the content is suspended. Note that, instead of displaying a message on the display 2A indicating that replay processing of the content is suspended, the control unit 23 may cause a speaker to output sound based on predetermined sound data, may drive a vibrator to vibrate in a predetermined vibration pattern, or may control a light emitting portion to emit light in a predetermined light-emitting pattern.

In Step ST41, the control unit 23 controls the replay processing unit 29 to suspend the replaying of the content. The replay processing unit 29 completely terminates the processing, which was suspended in Step ST35.

In this manner, even if the connection state is disconnected by a user's erroneous operation while the smartphone 1 is transmitting the content to the television 101, the transmission of the content is resumed from the disconnected position, on condition that the connection state is resumed within the time being set as the guard time (predetermined period of time); therefore, the user can continuously enjoy watching the content. In a case in which the connection state is disconnected while the smartphone 1 is transmitting the content to the television 101, and the connection state is not resumed within a period of time which is set as the guard time, the smartphone 1 can notify the user of the fact that the replay processing of the content is suspended.

In the present embodiment, the configurations and operations of the smartphone have been mainly described, but are not limited thereto, and may be configured as a control method and program, which are provided with each constituent element; and in a case in which the connection state is disconnected to suspend transmission of a content while transmitting the content to the external device by using the external interface 14, control is executed so as to resume the transmission of the content under a predetermined condition.

Furthermore, an embodiment may be implemented by recording a program for implementing functions of a smartphone in a computer-readable recording medium, and causing a computer system to read and execute the program recorded in the recording medium.

The "computer system" as used herein includes OS and hardware such as peripheral devices. The "computer-readable recording medium" refers to a portable medium such as a flexible disk, a magneto-optical disk, a ROM and a CD-ROM, and a storage device such as a hard disk incorporated into a computer system.

Furthermore, the "computer-readable recording medium" may also include a communication line for dynamically retaining a program over a short period of time, such as a communication line for transmitting a program over a network such as the Internet, or a communication line such as a telephone line; or volatile memory in a computer system serving as a server or client in this case for retaining a program over a certain period of time. The program may be intended to implement a part of the aforementioned functions, or may be able to implement the aforementioned functions in combination with a program that has been already recorded in a computer system.

In the present embodiment, the external interface (connector) 14 has been described as a terminal, to which another device is connected; however, the present disclosure is not limited thereto, and the external interface (connector) may be a wireless interface conforming to a wireless communication standard such as Bluetooth (registered trademark) and WiFi (registered trademark). Therefore, the electronic device of the disclosure of the present application may be communicatively connected to an external device by wireless communication conforming to a wireless communication standard.

EXPLANATION OF REFERENCE NUMERALS

1 smartphone
2A display
14 external interface
21 notification unit
22 communication unit
23 control unit
24 acceleration sensor unit
25 storage unit
26 sound collecting unit
27 receiving unit
28 processing unit
29 replay processing unit

The invention claimed is:

1. An electronic device comprising:
an interface configured to communicatively connect the electronic device to an external device;
a notification unit configured to provide notifications of incoming communications in response to incoming communications being received at the electronic device;
an acceleration sensor unit configured to detect acceleration acting on the electronic device; and
a control unit that, when an incoming communication is received in a state in which a predetermined condition, comprising at least a condition that the electronic device is communicatively connected to the external device via the interface and a condition that the acceleration sensor unit does not output a detection value higher than a predetermined value, is satisfied,
suppresses the notification of the incoming communication by the notification unit for as long as the electronic device is communicatively connected to the external device via the interface,
transmits a signal, indicating receipt of the incoming communication, to the external device via the interface, and
controls the external device to perform notification of the incoming communication.

2. The electronic device according to claim 1, wherein the notification unit comprises a vibrator and the notification comprises a vibration.

3. The electronic device according to claim 1, further comprising a storage unit for storing a plurality of applications, wherein the predetermined condition further comprises a condition that a predetermined application is not running.

4. The electronic device according to claim 3, wherein the predetermined application comprises an application for displaying a video on the external device.

5. The electronic device according to claim 1, wherein the predetermined condition further comprises a condition that a power source of the external device is turned on.

6. The electronic device according to claim 1, wherein the notification unit comprises a speaker, wherein the notification comprises a sound, and wherein suppressing the notification of the incoming communication by the notification unit comprises muting the sound.

7. The electronic device according to claim 1, wherein the notification unit comprises a speaker, wherein the notification comprises a sound, and wherein suppressing the notification of the incoming communication by the notification unit comprises reducing a volume of the sound.

8. The electronic device according to claim 1, wherein the notification unit comprises a vibrator, wherein the notification comprises a vibration, and wherein suppressing the notification of the incoming communication by the notification unit comprises preventing the vibration.

9. The electronic device according to claim 1, wherein the notification unit comprises a vibrator, wherein the notification comprises a vibration, and wherein suppressing the notification of the incoming communication by the notification unit comprises attenuating the vibration.

10. The electronic device according to claim 1, further comprising a memory storing a list of contacts, wherein the predetermined condition further comprises a condition that an initiator of the incoming communication is in the list of contacts.

11. The electronic device according to claim 1, wherein the control unit, when a user does not respond to the incoming communication and a subsequent incoming communication is subsequently received, from a same initiator as the incoming communication, in a state in which the predetermined condition is satisfied, does not transmit the signal, indicating receipt of the subsequent incoming communication, to the external device.

12. The electronic device according to claim 1, wherein the control unit, when the incoming communication is received in the state in which the predetermined condition is satisfied:
 monitors the volume level of sound being output by the external device; and
 waits until a segment, in which the monitored volume level falls below a predetermined threshold, to control the external device to perform the notification of the incoming communication.

13. The electronic device according to claim 1, wherein the control unit, when a communication is started while the electronic device is communicatively connected to the external device via the interface:
 determines a volume level of sound being output by the external device; and,
 when the volume level is higher than a predetermined threshold, controls the external device to suppress the volume level of the sound being output by the external device.

14. A control method for an electronic device, the method comprising:
 when an incoming communication is received while the electronic device is not communicatively connected to an external device via an interface, providing notification of the incoming communication via a notification unit of the electronic device; and,
 when an incoming communication is received while the electronic device is communicatively connected to the external device via the interface and a detection value, representing an acceleration acting on the electronic device, is not higher than a predetermined value,
  suppressing notification of the incoming communication via the notification unit of the electronic device for as long as the electronic device is communicatively connected to the external device via the interface, and
  controlling the external device to perform notification of the incoming communication, by transmitting a signal indicating receipt of the incoming communication to the external device via the interface.

15. The control method according to claim 14, further comprising, when a communication is started while the electronic device is communicatively connected to the external device via the interface:
 determining a volume level of sound being output by the external device; and,
 when the volume level is higher than a predetermined threshold, controlling the external device to suppress the volume level of the sound being output by the external device.

16. A non-transitory computer-readable medium storing instructions that, when executed by a processing device of a portable electronic device, cause the processing device to perform operations comprising:
 when an incoming communication is received while the portable electronic device is not communicatively connected to an external device via an interface, providing notification of the incoming communication via a notification unit of the portable electronic device; and,
 when an incoming communication is received while the portable electronic device is communicatively connected to the external device via the interface and a detection value, representing an acceleration acting on the electronic device, is not higher than a predetermined value,
  suppressing notification of the incoming communication via the notification unit of the portable electronic device for as long as the electronic device is communicatively connected to the external device via the interface, and
  controlling the external device to perform notification of the incoming communication, by transmitting a signal indicating receipt of the incoming communication to the external device via the interface.

17. The non-transitory computer-readable medium according to claim 16, wherein the operations further comprise, when a communication is started while the electronic device is communicatively connected to the external device via the interface:
 determining a volume level of sound being output by the external device; and,
 when the volume level is higher than a predetermined threshold, controlling the external device to suppress the volume level of the sound being output by the external device.

* * * * *